US010043236B2

(12) United States Patent
Sato et al.

(10) Patent No.: US 10,043,236 B2
(45) Date of Patent: Aug. 7, 2018

(54) DISPLAY DEVICE AND DISPLAY METHOD

(71) Applicant: Olympus Corporation, Shibuya-ku, Tokyo (JP)

(72) Inventors: Kazuhiro Sato, Sagamihara (JP); Kensei Ito, Sagamihara (JP); Tomomi Kaminaga, Musashino (JP); Naoki Fujii, Hachioji (JP); Kyoichi Numajiri, Hachioji (JP)

(73) Assignee: Olympus Corporation, Tokyo (JP)

( * ) Notice: Subject to any disclaimer, the term of this patent is extended or adjusted under 35 U.S.C. 154(b) by 119 days.

(21) Appl. No.: 14/704,595

(22) Filed: May 5, 2015

(65) Prior Publication Data
US 2015/0339801 A1    Nov. 26, 2015

(30) Foreign Application Priority Data

May 20, 2014 (JP) ................. 2014-104385
May 20, 2014 (JP) ................. 2014-104386

(51) Int. Cl.
G06T 3/00 (2006.01)
G06F 3/0484 (2013.01)
H04N 5/232 (2006.01)

(52) U.S. Cl.
CPC ........ G06T 3/0006 (2013.01); G06F 3/04845 (2013.01); H04N 5/23216 (2013.01); G06T 2200/24 (2013.01)

(58) Field of Classification Search
None
See application file for complete search history.

(56) References Cited

U.S. PATENT DOCUMENTS

2007/0286596 A1* 12/2007 Lonn .................. H04N 1/00387
                                                                    396/429
2011/0154394 A1*  6/2011 Brodersen ............. G06F 3/0482
                                                                    725/37

(Continued)

FOREIGN PATENT DOCUMENTS

JP    2005-135106    5/2005
JP    2010-113420    5/2010

OTHER PUBLICATIONS

"Fast and Super Useful Custom Home Application (Yandex) that is also Good for Beginners is Russian made," http://news.livedoor.com/article/detail/8196527/ (obtained Apr. 30, 2014) (4 pgs.).

(Continued)

*Primary Examiner* — Kee M Tung
*Assistant Examiner* — Yanna Wu
(74) *Attorney, Agent, or Firm* — John C. Pokotylo; Pokotylo Patent Services

(57) ABSTRACT

A display device comprises a display, a display control circuit for causing operation screens, for selection of setting items to be used from among a plurality of provided setting items, to be displayed on the display, and causing switching from the operation screen to another operation screen to be displayed, and an operation member for operating in order to switch from the operation screen to another operation screen, wherein the display control circuit causes display of change in display appearance of the setting items, when there is a switch from the operation screen to another operation screen.

17 Claims, 20 Drawing Sheets

(56) References Cited

U.S. PATENT DOCUMENTS

| 2012/0182296 | A1* | 7/2012 | Han | G06F 3/04883 |
| | | | | 345/419 |
| 2012/0224198 | A1* | 9/2012 | Kawabata | G06K 15/1882 |
| | | | | 358/1.9 |
| 2015/0288836 | A1* | 10/2015 | Kanki | H04N 1/00514 |
| | | | | 358/1.13 |

OTHER PUBLICATIONS

Office Action to corresponding Japanese Patent Application No. 2014-104386, dated Dec. 11, 2017 (4 pgs.).

* cited by examiner

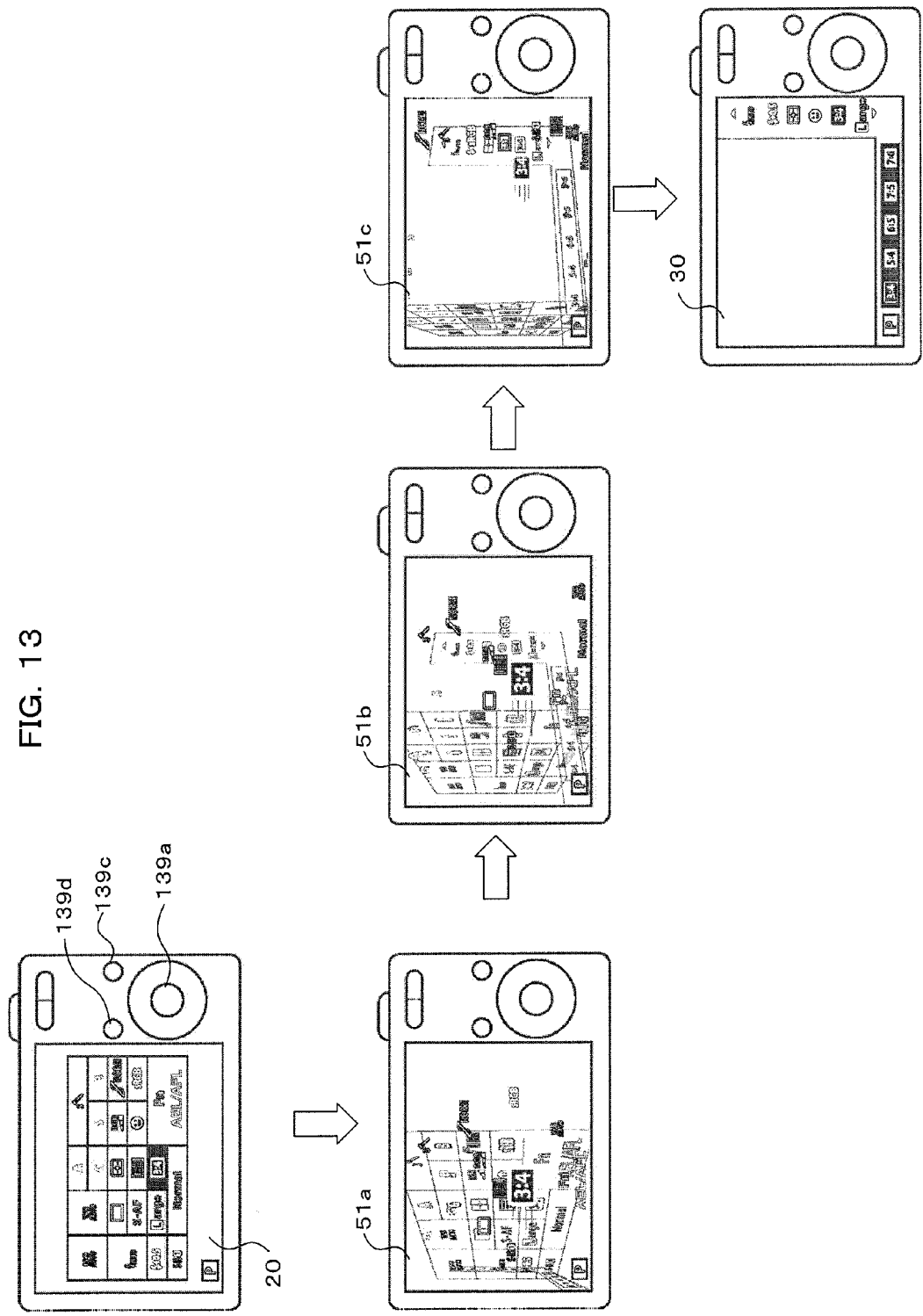

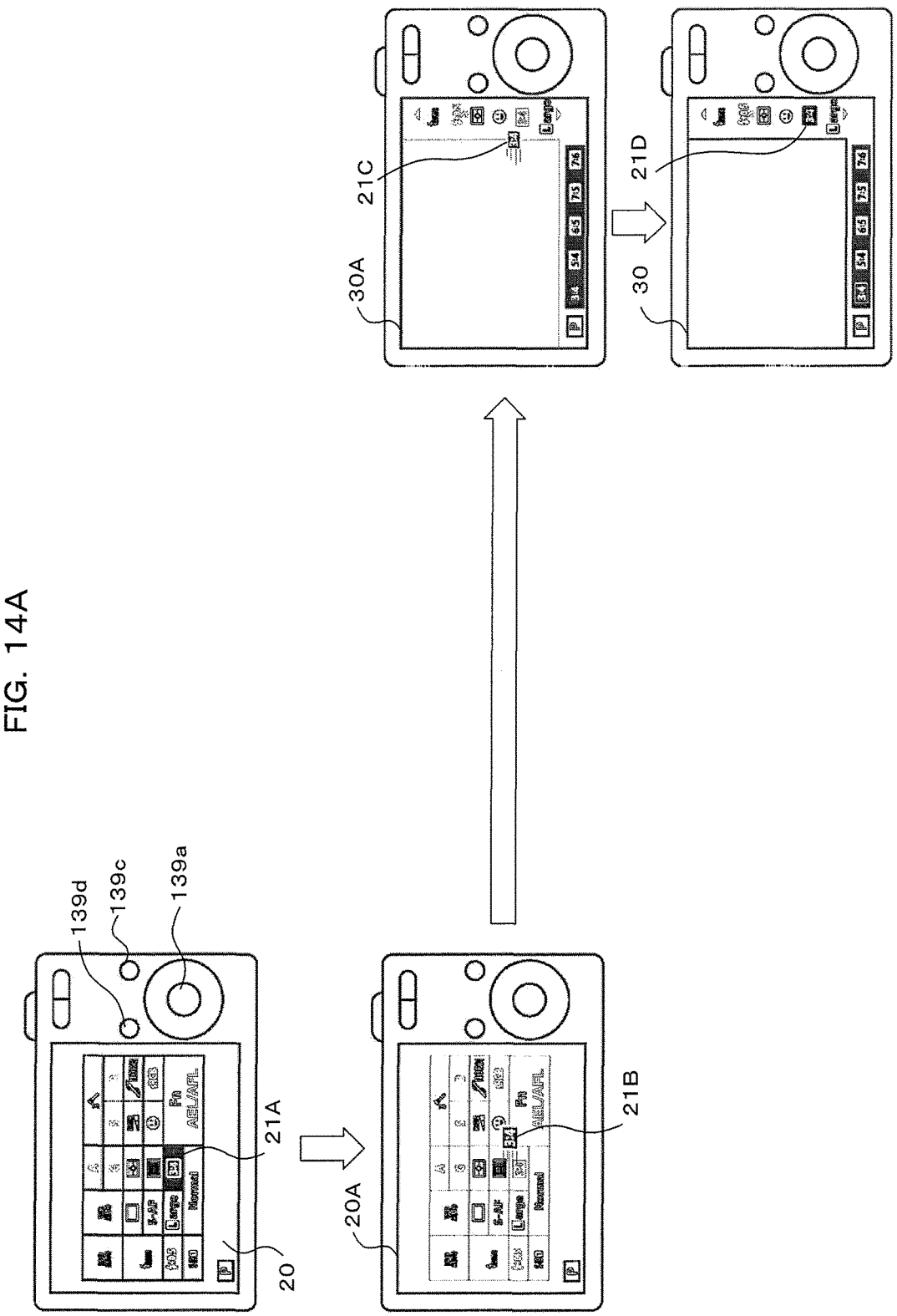

DISPLAY DEVICE AND DISPLAY METHOD

Benefit is claimed, under 35 U.S.C. § 119, to the filing date of prior Japanese Patent Application Nos. 2014-104385 filed on May 20, 2014, and 2014-104386 filed on May 20, 2014. These applications are expressly incorporated herein by reference. The scope of the present invention is not limited to any requirements of the specific embodiments described in the application.

BACKGROUND OF THE INVENTION

1. Field of the Invention

The present invention relates to a display device that is capable of display by switching a plurality of operational screens, a display method, and a program.

2. Description of the Related Art

A plurality of operation screens for changing setting items are being adopted in various devices, and a user changes various setting items by causing a desired operation screen to be displayed. As operation screens there are an operation screen of a personal computer (PC), and with this PC operation screen it is possible to carry out change in display format, such as changing the size of icons or displaying in a list format etc.

Also, a plurality of screens are displayed as applications for a smartphone at the same time on a single screen (refer to non-patent publication 1 below). Further, a display control device that allows a user to be visually aware of switching operations and to give the user a conceptual overview of information before and after switching of display images is disclosed in Japanese patent laid-open No. 2005-135106. This display control device, in a case of switching a display screen from a display screen A to a display screen B, carries out an animation display to move the display screen A before switching so as to gradually become transparent and disappear (phase out), and to move the display screen B that is the switching target so as to gradually appear (fade in).

Non-patent literature 1: Product promotion for smartphone application "Yandex", "Fast and super useful custom home application (yandex) that is also good for beginners is Russian made." [online], [searched on Apr. 30, 2014], Internet address (http://news.livedoor.com/article/detail/8196527/)

Also, technology is now more widely known for providing a plurality of operation screens for changing setting items, and displaying the same setting items in different display formats. For example, with a digital camera a plurality of operation screens are provided that are characterized by making it easy to perform a change operation for shooting setting items depending on a scene to be shot. Specifically, shooting is performed by setting with careful verification of a list display of setting items, shooting is carried out by setting items while verifying a live view image, or shooting is carried out by setting a plurality of setting items with a single operation of a guide item, that is expressed as words such that the user can intuitively understand, etc. Also, since there are a plurality of operation screens, as described, it is possible to use operation screens that are appropriate to the photography skill level of the user. In this way, technology for displaying the same setting items in different display formats by providing a plurality of operation screens in order to change setting items is frequently used.

SUMMARY OF THE INVENTION

With the previously described PC operation screens, it was only possible to carry out change of display format, and no consideration whatsoever was given to screen transition while switching operation screens. Also, with the smartphone application disclosed in non-patent literature 1, since a number of icons for operations can not be displayed once, there is only switching of a screen, and there is no setting of the same setting items with respective operation screens. In the display control device disclosed in patent literature 1, display screen A and display screen B are not operation screens specialized for operating setting items. Here, a specific screen may be, for example, a screen that makes it easy to carry out change operations for shooting setting items in accordance with a shooting scene.

Also, with the technology for displaying the same setting items in different display formats by providing a plurality of operations screens for changing the setting items, since there may be situations where operation screens in different display formats are displayed, even at the time that a user sets the same shooting setting items, if operation screens are switched without the user recognizing that these plurality of operation screens are operation screens for the same system, there is a possibility of a user misunderstanding that it is switched into another hierarchical layer or another operation screen.

An object of the present invention is to provide a display device, display method, and program, that make it easy to understand that the same hierarchical level or same operation screen has been changed to when operation screens have been switched, and that make it easy to understand where setting items are displayed after switching, when positions where the same setting items are displayed differ before and after switching.

A display device of the present invention comprises a display, a display control section for causing operation screens, for selection of setting items to be used from among a plurality of provided setting items, to be displayed on the display, and causing switching from the operation screen to another operation screen to be displayed, and an operation section for operating in order to switch from the operation screen to another operation screen, wherein the display control section causes display of change in display format of the setting items, when there is a switch from the operation screen to another operation screen.

A display method of the present invention, for a display device having a display, comprises causing operation screens, for selection of setting items to be used from among a plurality of provided setting items, to be displayed on the display, detecting whether there has been an operation to switch from the operation screen to another operation screen, and when detecting whether the operation has been performed, if it is detected that the operation for switching has been performed, causing display of switching from the operation screen to another operation screen, wherein, when there is a switch from the operation screen to another operation screen, change in display appearance of the setting items is displayed.

BRIEF DESCRIPTION OF THE DRAWINGS

FIG. 13 is a drawing showing a fifth modified example of display appearance for switching from a super control screen to a live control screen, in the camera of one embodiment of the present invention.

FIG. 14A is a drawing showing a first aspect of the first modified example showing change in position of setting items when switching from a super control screen to a live control screen, in the camera of one embodiment of the present invention.

DETAILED DESCRIPTION OF THE PREFERRED EMBODIMENTS

An example where a digital camera is adopted as one embodiment of the present invention will be described in the following. This camera has an imaging section, with a subject image being converted to image data by this imaging section, and the subject image being subjected to live view display on a display arranged on the rear surface of the camera body based on this converted image data. A photographer determines composition and photo opportunity by looking at the live view display. At the time of a release operation image data is stored in a storage medium. Image data that has been stored in the storage medium can be played back and displayed on the display if playback mode is selected.

Figure 2:
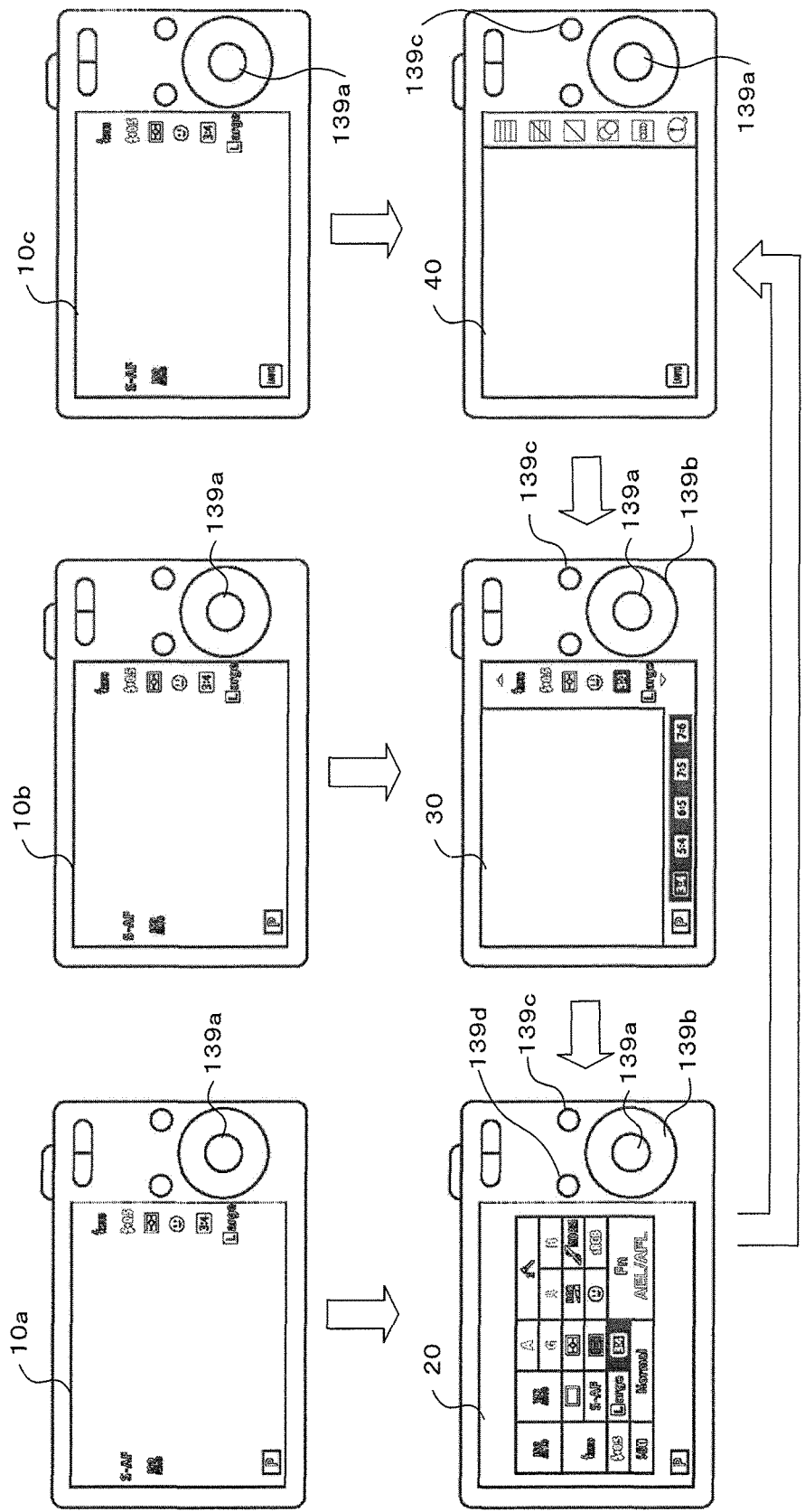
FIG. 2 is a drawing for describing switching from a shooting standby state to the operation mode screens, in the camera of one embodiment of the present invention.

Also, three operation screens are displayed as operation screens on the display camera of this camera, namely a super control screen (refer to 20 in FIG. 2, for example), a live control screen (refer to 30 in FIG. 2, for example), and a live guide screen (refer to 40 in FIG. 2, for example).

Using the plurality of operation screens, it is possible to simplify change operations for shooting setting items in accordance with shooting scene, such as shooting is performed by setting with careful verification of a list display of setting items, shooting is carried out by setting items while verifying a live view image, or shooting is carried out by setting a plurality of setting items with a single operation of a guide item, that is expressed as words such that the user can intuitively understand, etc. Also, as a result of there being the plurality of operation screens, it is possible to use operation screens that are appropriate to the photography skill level of the user.

On the respective operation screens it is possible to change settings for setting items such as exposure compensation, aperture value, shutter speed, saturation, contrast, WB mode (white balance mode) etc., and these operation screens can be changed using operation members or a touch operation on a touch panel etc. When an operating screen is changed to another operating screen, a plurality of operation screens are displayed simultaneously so that it is easy to understand that there has been a change to the same hierarchical layer or same operation screen. Also, when the operation screen is switched, even if position where the same setting items is displayed differs before and after switching, change of display appearance is displayed so that it is easy to understand where setting items are displayed after switching.

Figure 1:
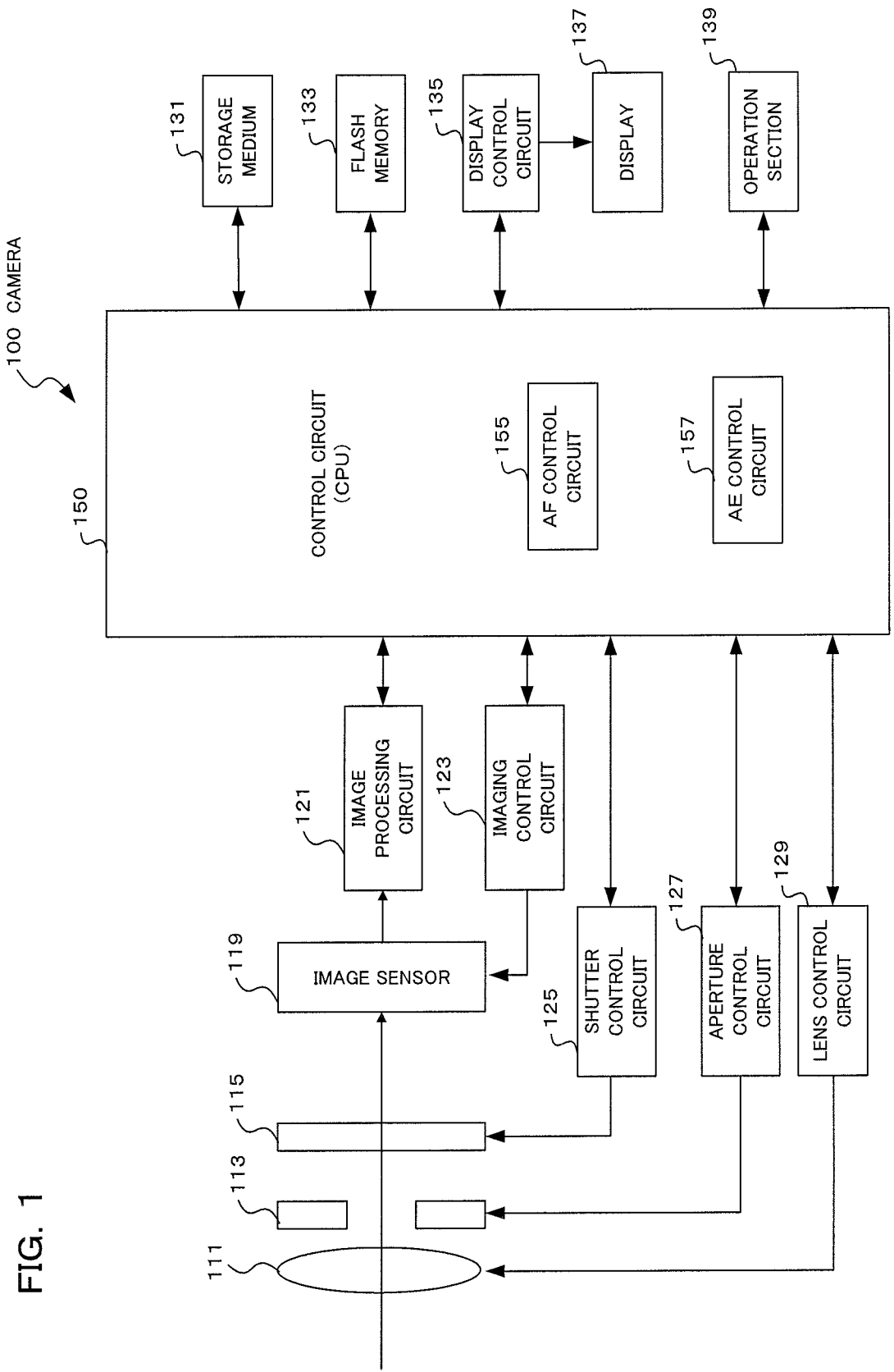
FIG. 1 is a block diagram mainly showing the electrical structure of a camera of one embodiment of the present invention.

Preferred embodiments using a camera to which the present invention has been applied will be described in the following in accordance with the drawings. FIG. 1 is a block diagram showing the schematic structure of a camera 100 of this embodiment. A photographing lens 111 is an optical lens for forming an image of the subject, and has a focus lens and a zoom lens that move in an optical axis direction under the control of a lens control circuit 129. An aperture 113 and shutter 115 are arranged on the optical axis of the photographing lens 111, and an image sensor 119 is arranged on the optical axis of the photographing lens 111 and close to an image forming position of an optical image.

The aperture 113 has a variable aperture diameter, and controls light flux of a shooting optical system. An aperture control circuit 127 controls aperture value corresponding to aperture diameter. The aperture 113 regulates light amount of subject light flux that has passed through the photographing lens 111, based on control signals from the aperture control circuit 127.

The shutter 115 causes subject light flux to pass for a time determined by shutter speed, based on control signals from a shutter control circuit 125. Also, the shutter is kept released at the time of live view display.

With this embodiment, the aperture 113, shutter 115 and photographing lens 111 are arranged on the optical axis for the purpose of carrying out exposure control, but exposure control may also be carried out with some of these elements omitted. Also, shutter time may be controlled using an electronic shutter with the image sensor 119, instead of the shutter 115, and it is also possible to put an ND filter on or off the optical axis.

The image sensor 119 photoelectrically converts a subject image that has been formed by the photographing lens 111, and outputs image data to an image processing circuit 121. An imaging control circuit 123 carries out control such as charge accumulation and readout of the image sensor 119, based on control signals from a control circuit 150. The image processing circuit 121 is input with image data from the image sensor 119, carries out various image processing, such as amplification processing, A/D conversion processing, OB processing, gamma processing and WB processing etc., and outputs image data that has been subjected to image processing to the control circuit 150.

As well as the previously described image processing circuit 121, imaging control circuit 123, shutter control circuit 125, aperture control circuit 127, and lens control circuit 129, a storage medium 131, a flash memory 133, display control circuit 135, display 137 and operation section 139 are connected to the control circuit 150.

The storage section 131 has storage media, and image data that has been output from the image processing circuit 121 is stored in the storage media. At the same time as storage of image data, voice data that has been output from a voice processing circuit (not shown) can also be stored in the storage media. The flash memory 133 is an electrically rewritable non-volatile memory, and stores adjustment values for the camera 100, and programs for execution of the control circuit 150. Another electrically rewritable memory may also be used instead of the flash memory 133.

The display control circuit 135 outputs image data, that has been input from the control circuit 150, to the display 137, and displays the image data on the display 137. As data for display, there is data for live view display, for subject confirmation, data for playback display of an image that has been stored in the storage section 131, and data for menu screen display, as well as data for operation screens such as a super control screen, live control screen, and live guide screen etc. When switching the operation screen, switching display images are created, as will described using FIG. 3 to FIG. 16, and output to the display 137. The display control circuit 135 may be configured of hardware, and may be executed using software by the control circuit 150.

The display control circuit 135 causes display of operations screens, for selection of setting items to be used from among a plurality of setting items that have been provided, on the display, causes display of switching from an operation screen to another operation screen, and when switching from one operation screen to another operation screen, causes display of change in display appearance of the setting items. The display control circuit 135 also displays transition states for position of the setting items when operation screens are switched.

Figure 18:
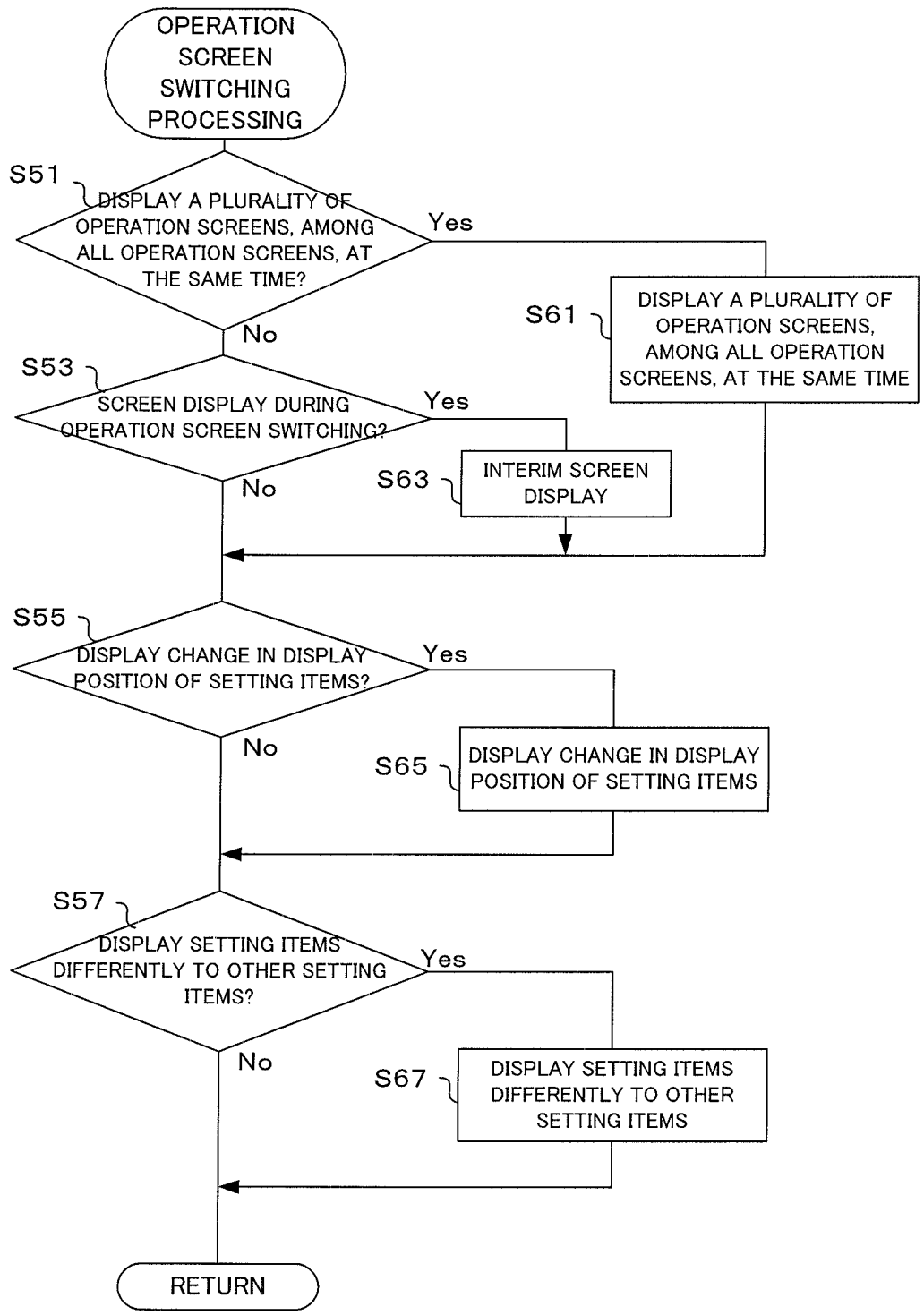
FIG. 18 is a flowchart showing operation for operation screen switching processing, in the camera of one embodiment of the present invention.

The display control circuit 135 also displays setting items, for which display position of the setting items changes, differently to other setting items when the operation screen is switched (refer to S67 in FIG. 18). As well as changing display position of the setting items when the operation screen is switched, the display control circuit 135 also displays those setting items by changing size (refer to 22c in FIG. 3).

The display control circuit 135 causes display of operations screens, for selection of setting items to be used from among a plurality of setting items that have been provided, on the display, and when switching from one operation screen to another operation screen displays a plurality of operation screens at the same time. Here, displaying a plurality of operation screens simultaneously means displaying at least some or all of regions of the operation screens before and after switching at the same time. Also, the plurality of operation screens may be screens where at least some setting items are the same but the display format is different, or the plurality of operation screens may be screens where at least some of the setting items are the same but the number of setting items to be displayed on the operation screen, or the display positions of the setting items, are different (refer, for example, to FIG. 5). Also, within the plurality of operation screens, at least one is an operation screen with which it is possible to set a plurality of shooting parameters at the same time by changing a single setting item (refer to FIG. 7, for example).

Figure 3:
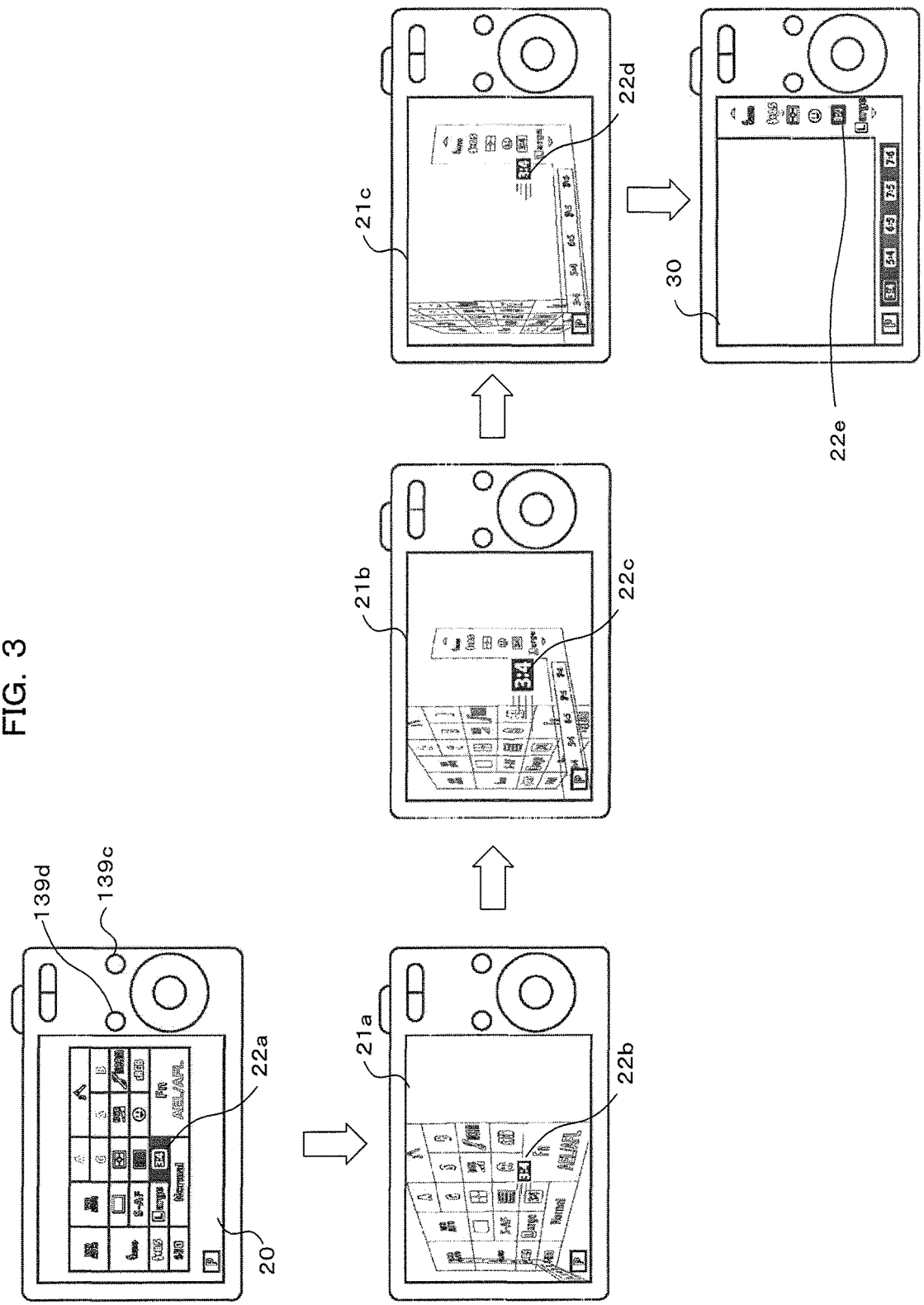
FIG. 3 is a drawing showing display appearance for switching from a super control screen to a live control screen, in the camera of one embodiment of the present invention.

The display control circuit 135 also performs switching display by rotating the operation screen about a rotational axis (for example, refer to FIG. 3). The display control circuit 135 also performs switching display by sliding the operation screen (for example, refer to FIG. 10). Also, when switching from an operation screen to another operation screen the display control circuit 135 switches screens in a direction that requires fewer switches (refer to FIG. 2, for example). At the time of switching an operation screen, the display control circuit 135 displays change in display appearance of the setting items (for example, refer to FIG. 3 etc.). The display control circuit 135 also displays transition states for position of the setting items when operation screens are switched. The display control circuit also displays setting items for which display position of the setting items changes differently to other setting items when the operation screen is switched (refer to S67 in FIG. 18). Together with changing display position of the setting items when switching operation screen, the display control circuit 135 also displays those setting items by changing size (refer to 22c in FIG. 3).

The display 137 has a display member such as a liquid crystal panel provided on a rear surface of the camera 100, and performs live view display, playback display, and display of menu screens and operation screens, based on output of the display control circuit 135. The display 137 may be provided elsewhere besides on the rear surface of the camera, and may be an electronic viewfinder (EVF).

The operating section 139 has operation members 139a-139d etc. (refer to FIG. 2), and has various operation members such as a release button and a menu button etc. There is also a touch panel for detecting a touch operation on the screen of the display 137, and operating states of these operation members are detected and output to the control circuit 150. The operation section 139 functions as an operation section for operating in order to switch from an operation screen to another operation screen. This operation section is operated in order to directly switch to a designated operation screen (for example, refer to FIG. 2).

A CPU (Central processing unit) that is not shown, and peripheral circuits for the CPU, are provided within the control circuit 150, and the CPU carries out overall control of the camera 100 in accordance with programs that have been stored in the flash memory 133. An AF control section 155 and an AE control section 157 are also provided within the control circuit 150. The AF control section 155 and the AE control section 157 may be made up in whole or in part of hardware, and may also be constituted by software.

The AF control section 155 extracts contrast signals using image data based on output of the image sensor 119, and by means of the lens control circuit 129 controls position of a focus lens within the photographing lens 111 such that this contrast signal becomes a peak.

The AE control section 157 obtains a subject brightness value using image data based on output of the image sensor 119, calculates aperture value, shutter speed and ISO sensitivity to achieve optimal exposure based on this subject brightness value, and performs control by means of the shutter control circuit 125 and the aperture control circuit 127 based on the calculated results.

Next, switching of operation screens of the camera of this embodiment will be described. FIG. 2 is a rear view of the camera of this embodiment, and shows switching from a shooting standby state to three operation screens. The upper half of FIG. 2 shows the shooting standby state, while the lower half shows three operation screens after switching.

If a shooting mode A is set in the camera 100 and the camera is in a shooting standby state, a shooting standby screen 10a as shown at the upper left of FIG. 2 is displayed on the display 137. Together with display of a live view image on this shooting standby screen 10a based on image data from the image sensor 119, current setting states (for example, flash settings, exposure compensation, photometry mode, AF mode, single shooting/continuous shooting etc.) are displayed on the right side and left side of the screen. In this state it is only possible to know the current setting values and it is not possible to change each of the setting items.

In a state where shooting mode A has been set and the shooting standby screen 10a is being displayed, if the operation member 139a of the operation section 139 is operated, a super control screen 20 is switched to and it becomes possible to change setting items. This super control screen 20 displays each setting item of the camera 100 in a display format, and the user can select an item they wish to change, and then change that item, by operating the operation member 139b (having a function as a cross-shaped button). With this super control panel screen 20 shown in FIG. 2, an item for changing screen aspect ratio has been selected (in the drawing, changed to reversed display characters). With this super control screen 20, many setting items are displayed, and almost the whole screen of the display 137 is used in order to prioritize setting change, and the live view image is therefore hidden.

Next, if shooting mode B is set in the camera 100 and the camera is in the shooting standby state, a shooting standby screen 10b as shown in the middle at the upper half of FIG. 2 is displayed on the display 137. Similarly to the shooting standby screen 10a, this shooting standby screen 10b displays a live view image, and also displays the current setting state on both sides of the screen. As described previously, in this state it is not possible to change each of the setting items.

In a state where shooting mode B has been set and the shooting standby screen 10b is being displayed, if the operation member 139a of the operation section 139 is operated, a live control screen 30 is switched to and it becomes possible to change setting items. This live control screen 30 displays a live image on an enlarged portion of the screen, and displays setting items on the right side, and it is possible to select setting items in an up-and-down direction by operating the operation member 139b. If any setting item is selected, change content corresponding to content of the selected setting item is displayed at the bottom of the screen, and the user can then select any setting item that is arranged in a left to right direction by operating the operation member 139b. As items (functions) that can be set on this live control screen 30 there are, for example, picture mode (setting of image finish), hand shake correction, white balance, drive/self timer, aspect ratio, quality mode, flash mode, photometry method, AF method, ISO sensitivity etc.

With the example of the live control screen 30 shown in FIG. 2, aspect ratio (in the right column, it is shown that "3:4" is currently set as the aspect ratio) is selected, and at the bottom of the screen, as well as 3:4, aspect ratios of 5:4, 6:5, 7:5 and 7:6 are displayed. With the live control screen 30, since all of the setting items are not displayed in the right column of the screen at one time, the setting items are sequentially displayed using scroll display by operating the operation member 139b. Similarly, in cases where it is not possible to display all setting values in the lower area sequential display is carried out using scroll display.

Next, if shooting mode C is set in the camera 100 and the camera is in the shooting standby state, a shooting standby screen 10c as shown at the upper right of FIG. 2 is displayed on the display 137. Similarly to the shooting standby screen 10a, this shooting standby screen 10c displays a live view image, and also displays the current setting state on both sides of the screen. As described previously, in this state it is not possible to change each of the setting items.

In a state where shooting mode C has been set and the shooting standby screen 10c is being displayed, if the operation member 139a of the operation section 139 is operated, a live guide screen 40 is switched to and it becomes possible to change guide items. Guide items are setting items for the user to carry our shooting intuitively, for example, expressing in words creative decisions such as change in color vividness, change in brightness, blurring of the background, and expression of movement etc. It is possible even for a beginner to simply operate in accordance with how they want to change the shot image. In this way the live guide screen 40 makes it possible for the user to perform intuitive operation in shooting even though there are only a few guide items. With the live guide screen 40 a live image is displayed on an enlarged section of the screen with guide items being displayed on the right side, and it is possible to select guide items in the vertical direction by operating the operation member 139b (having a cross-key button function). If any guide item is selected change content corresponding to content of the selected guide item is displayed on the screen (not shown), and the user can then select any guide item by operating the operation member 139b.

If "brightness" is selected as a guide item, the camera carries out setting change for setting items such as exposure correction that are related to brightness. Also, if "background blurring" is selected setting change is carried out for setting items such as aperture value that are related to background blur. If "movement" is selected setting change is carried out for setting items such as shutter speed, that are related to movement. If "vividness" is selected, setting change is carried out for setting items such as white balance and tone that are related to vividness. If "color cast" is selected, setting change is carried out for setting items such as saturation that are related to color cast.

If the operation member 139c is operated when an operation screen (super control screen 20, live control screen 30, live guide screen 40) is being displayed, the operation screen is sequentially changed. Specifically, every time the operation member 139c is operated the operation screen is changed cyclically in the order live guide screen 40→ live control screen 30→ super control screen 20→ live guide screen 40. As will be described later, it is also possible to change the operation screen in the reverse direction (for example, refer to FIG. 4) by operating the operation member 139d.

In this way, with this embodiment if the operation member 139a is operated, operation screens 20, 30, 40 respectively appropriate to a shooting mode that is set are displayed, setting items are selected, and it is possible to change settings for the selected setting items. Also, for the operation screen 20, 30, 40 being displayed, if the operation member 139c is operated it is possible to cyclically change the operation screens 20, 30, 40.

With this embodiment, the operation screen that is initially displayed is determined based on shooting mode. However, this is not limiting, and an operation screen corresponding to an operation member (for example, 139a, 139c, 139d) of the operation section 139 may be predetermined, and if that operation member is operated the corresponding operation screen may be displayed regardless of shooting mode. Also, with this embodiment, selection of setting items is carried out using operation of the operation member 139b, but this is not limiting, and it is also possible, for example, if a user touches a setting item, to detect this touch using the touch panel, and select that setting item.

Next, using FIG. 3 to FIG. 15, display appearance when, after an operation screen has been displayed, another operation screen is switched to as a result of operating the operation member 139c or 139d, will be described for this embodiment and a modified example. At the time of switching operation screens, the operation screen becomes transparent and fades away in reality, but for convenience of illustration, the operation screen remains as line drawings.

FIG. 3 shows display appearance when switching from the super control screen 20 to the live control screen 30. If the operation member 139d is operated in the super control screen 20 shown upper left in FIG. 3, there is a change to the live control screen 30 shown lower right in FIG. 3, and there is not an immediate change to the live control screen 30 but a change to the live control screen 30 after passing through transition screens 21a, 21b and 21c.

In screen transitioning, with this embodiment the screens are made to appear as if pages were being turned, with the left edge of a screen of a table in the super control screen 20 and a left edge of the live control screen 30 being made an axial center, that is, display is carried out so that the page of the super control screen 20 is dismissed so it can no longer be seen, and then the live control screen 30, which is the next page, comes into view.

Also, when transitioning, display is performed so that change in position of the setting item on the transition screens 21a, 21b, and 21c can be understood, so that it can be known what position setting items that have been selected on the super control screen 20 have moved to in the live control screen 30. In the example shown in FIG. 3, aspect ratio 22a has been selected on the super control screen 20. If the user operates the operation member 139d in this state, the aspect ratio 22a is moved to the position 22b in transition screen 21a, to position 22c in transition screen 21b and to position 22d in transition screen 21c, and the fact that the aspect ratio 22a is finally moved to position 22e in the live control screen 30 is made clear. Also, by displaying the size of the aspect ratio 22c larger than the aspect ratio 22a and aspect ratio 22a in the operation screens 20 and 30 during the transition (this also applies to FIG. 4 etc. which will be described later), it is possible to emphasize the fact that there is movement.

Figure 4:
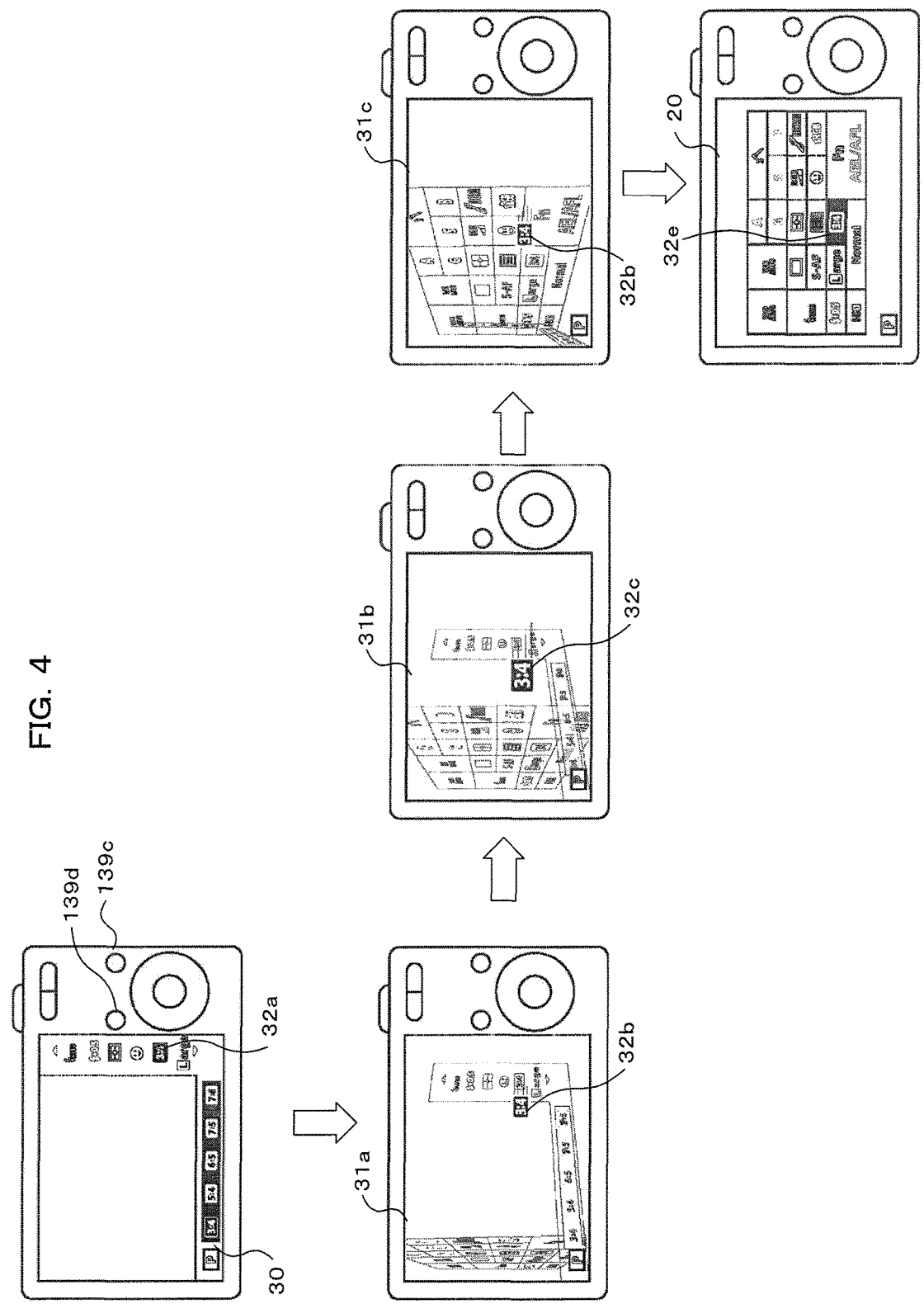
FIG. 4 is a drawing showing display appearance for switching from a live control screen to a super control screen, in the camera of one embodiment of the present invention.

FIG. 4, opposite to FIG. 3, shows display appearance when changing from the live control screen 30 to the super control screen 20. If the operation member 139c in the live control screen 30 shown at the upper left of FIG. 4 is operated, the super control screen 20 shown at the lower right of FIG. 4 is changed to, but it is not an immediate change to the super control screen 20, and the super control screen 20 is changed to after passing through transition screens 31a, 31b and 31c.

In screen transitioning, the screens are made to appear as if pages were being turned back, with the left edge of a screen of a table in the super control screen 20 and a left edge of the live control screen 30 being made an axial center, that is, display is carried out so that the page of the live control screen 30 is turned back, and then the super control screen 20, which is the previous page, comes into view.

Also, in transitioning, a setting item that has been selected on the live control screen 30 is displayed so that change in position of the setting item in the transition screens 31a, 31b, and 31c is understood, so that it can be understood what position that setting items has moved to in the super control screen 20. With the example shown in FIG. 4 also, aspect ratio 32a is being selected in the live control screen 30. If the operation member 139c is operated in this state, the aspect ratio 32a moves to position 32b in transition screen 31a, to position 32c in transition screen 31b, to position 32d in transitions screen 31c, and is finally moved to position 32e in the super control screen 20.

Figure 5:
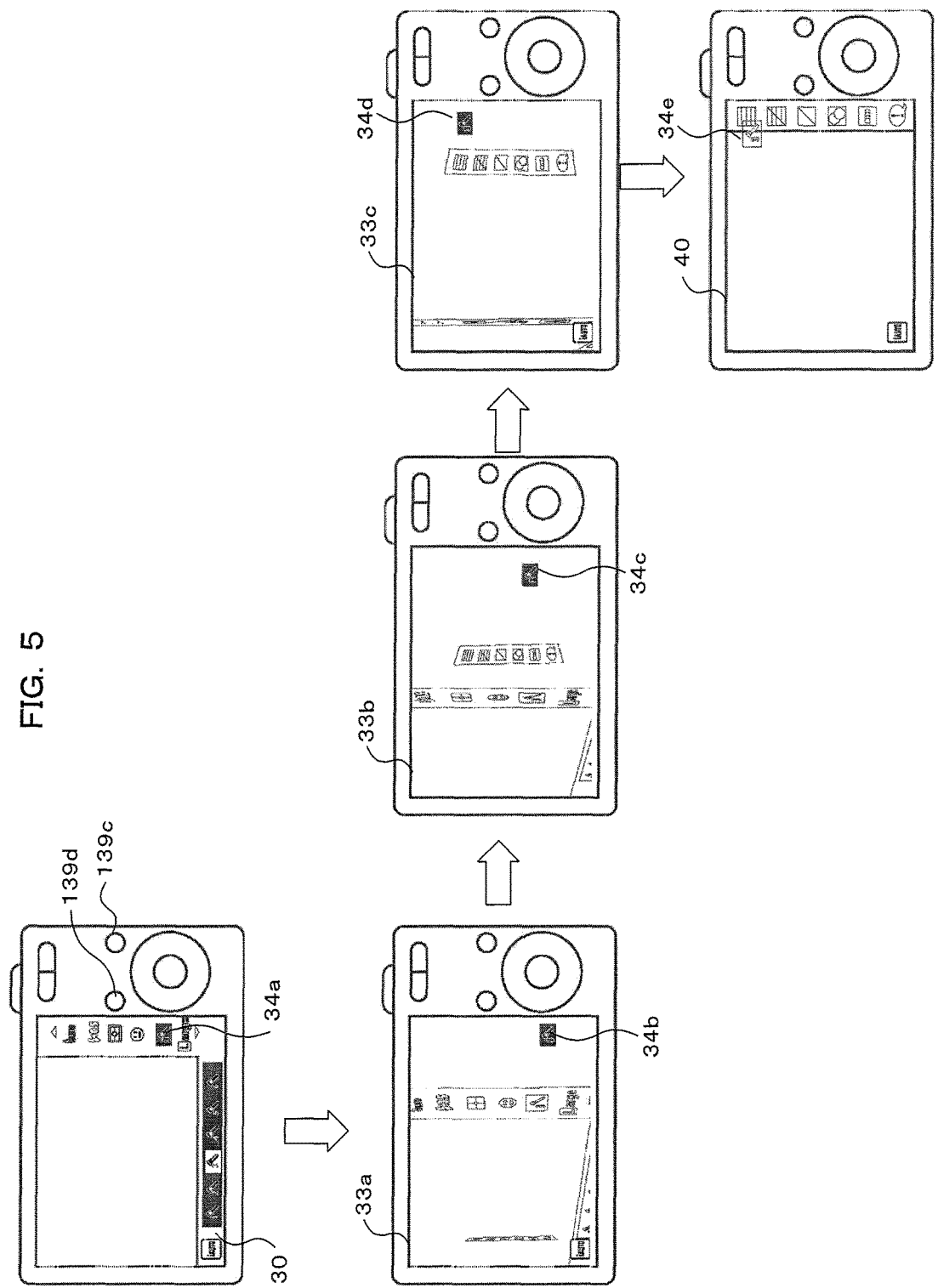
FIG. 5 is a drawing showing display appearance for switching from a live control screen to a live guide screen, in the camera of one embodiment of the present invention.

FIG. 5, shows display appearance when changing from the live control screen 30 to the live guide screen 40. If the operation member 139d is operated for the live control screen 30 shown at the upper left in FIG. 5, the live guide screen 40 shown at the lower right in FIG. 5 is changed to, but there is not an immediate change to the live guide screen 40 and instead the live guide screen 40 is changed to after passing through transition screens 33a, 33b, and 33c.

In screen transitioning, the screens are made to appear as if pages are being turned, with the left edge of a screen of a table in the live control screen 30 and a left edge of the live guide screen 40 being made an axial center, that is, display is carried out so that the page of the live control screen 30 is pulled back, and then the live guide screen 40, which is the next page, comes into view (refer to transition screens 33a, 33b and 33c).

Also, in transitioning, a setting item that has been selected on the live control screen 30 is displayed so that change in position of the setting item in the transition screens 33a, 33b, and 33c is understood, so that it can be understood what position that setting items has moved to in the live guide screen 40. With the example shown in FIG. 5, picture mode 34a is being selected in the live control screen 30. If the user operates the operation member 139d in this state, the picture mode 34a is moved to position 34b in transition screen 33a, to position 34c in transition screen 33b, and to position 34d in transition screen 33c, and is finally moved to position 34e in the live guide screen 40. As was described previously, with the live guide screen 40, since there are guide items that the user can grasp intuitively, picture mode belongs to an item "color cast" on the live guide screen 40.

Figure 6:
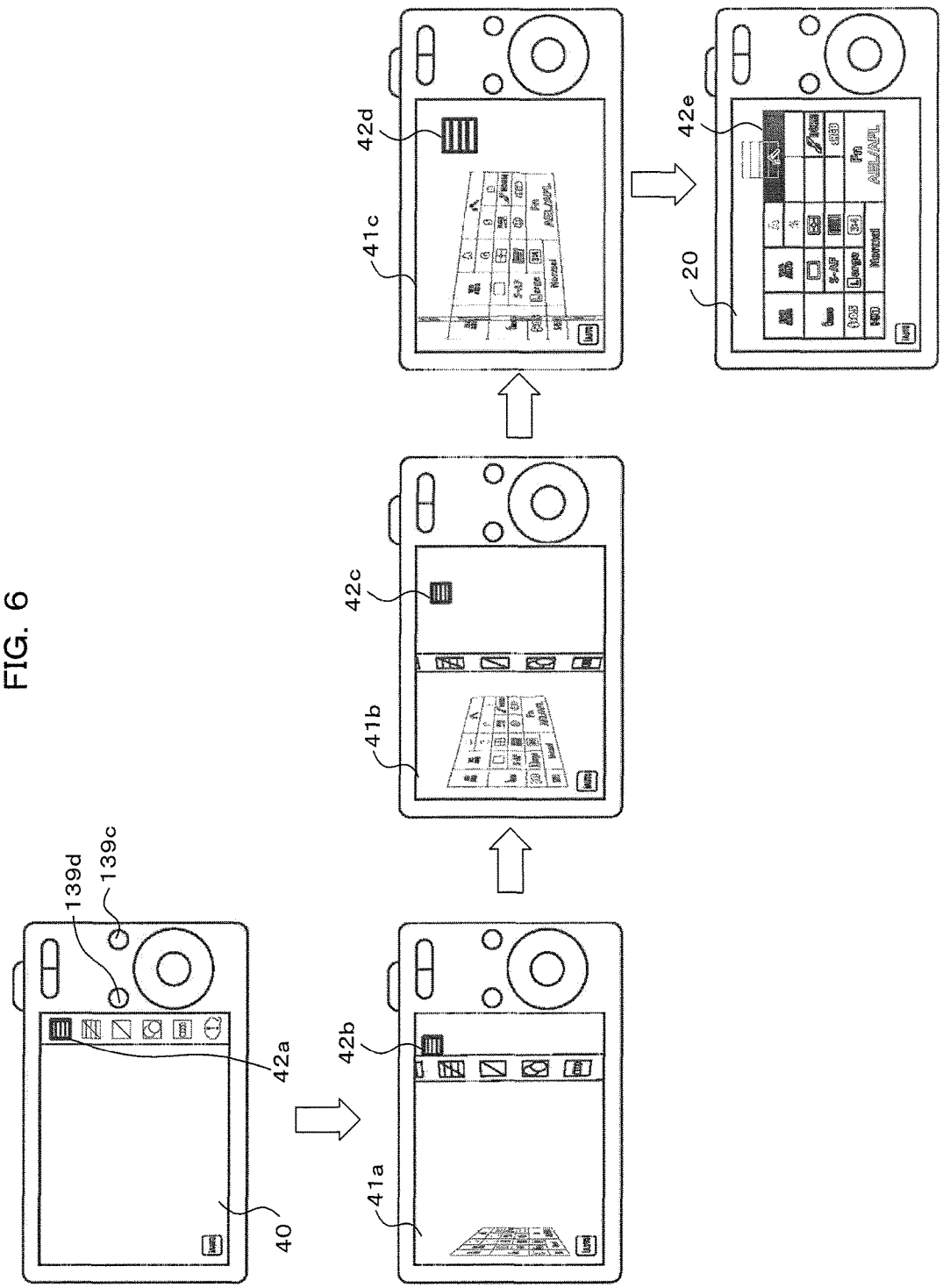
FIG. 6 is a drawing showing a first display appearance for switching from a live guide screen to a super control screen, in the camera of one embodiment of the present invention.

FIG. 6 shows display appearance when changing from the live guide screen 40 to the super control screen 20. If the operation member 139d in the live control screen 30 shown at the upper left of FIG. 6 is operated, the super control screen 20 shown at the lower right of FIG. 6 is changed to, but it is not an immediate change to the super control screen 20, and the super control screen 20 is changed to after passing through transition screens 41a, 41b and 41c.

Also, in transitioning, display is carried out so that change in position of a setting item in the transition screens 41a, 41b, and 41c is understood, so that it can be understood what position a guide item that has been selected on the live guide screen 40 has moved to in the super control screen 20. In the example shown in FIG. 6, color cast 42a is being selected in the live guide screen 40. If the operation member 139c is operated in this state, operation screen switching processing is commenced, and the color cast 42a moves to position 42b in transition screen 41a, to position 42c in transition screen 41b, and position 42d in transition screen 41c, and is finally moved to position 42e in the super control screen 20. With the live guide screen 40, since there are guide items that the user can grasp intuitively, with the super control screen 20 handling of color cast results in an item "picture mode".

As was described previously, with the live guide screen 40, display that the user can grasp intuitively is carried out, and so there may be situations where there are a plurality of setting items corresponding to a guide item when changing to another operation screen. A case where there are a plurality of setting items will be described using FIG. 7.

Figure 7:
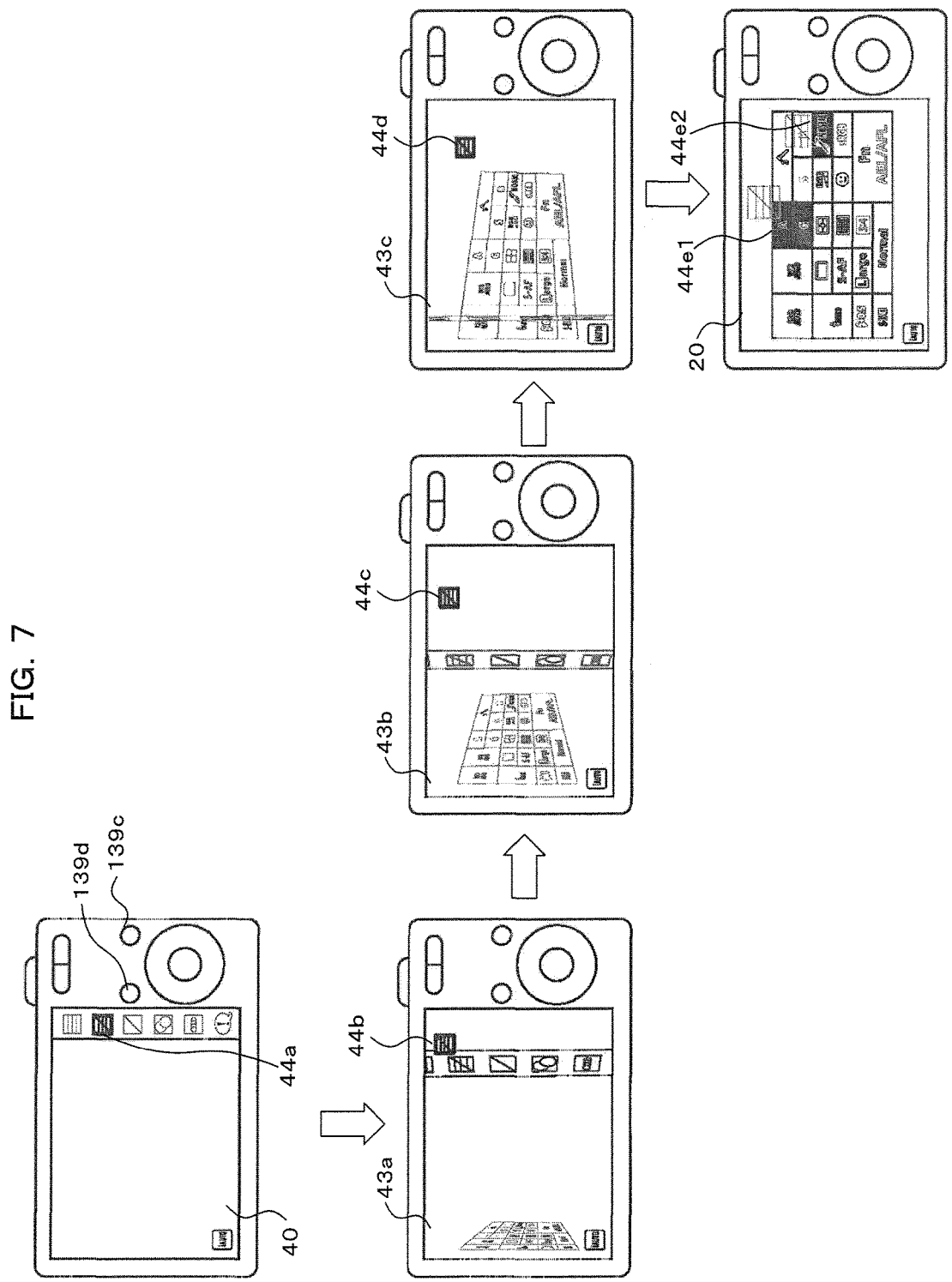
FIG. 7 is a drawing showing a second display appearance for switching from a live guide screen to a super control screen, in the camera of one embodiment of the present invention.

FIG. 7 shows a second display appearance when changing from the live guide screen 40 to the super control screen 20. If the operation member 139d in the live guide screen 40 shown at the upper left of FIG. 7 is operated, the super control screen 20 shown at the lower right of FIG. 7 is changed to, but it is not an immediate change to the super control screen 20, and the super control screen 20 is changed to after passing through transition screens 43a, 43b and 43c.

In screen transitioning, similarly to the example shown in FIG. 6, change is performed so that the screens appear to be pages being turned, with the left edge of the super control screen 20 and the left edge of the live guide screen 40 being made an axial center (refer to transition screens 43a, 43b and 43c). Also, in transitioning, display is carried out so that change in position of a setting item in the transition screens 43a, 43b, and 43c is understood, so that it can be understood what position a guide item that has been selected on the live guide screen 40 has moved to in the super control screen 20.

In the example shown in FIG. 7, vividness 44a is selected as a guide item in the live guide screen 40. If the user operates the operation member 139d in this state, the vividness 44a is moved to position 44b in transition screen 43a, to position 44c in transition screen 43b, and to position 44d in transition screen 43c, and is finally moved to white balance at position 44e and saturation at position 44e1 in the super control screen 20. As was described previously, since with the live guide screen 40 it is intended to provide guide items that can be intuitively understood by the user, handling of "vividness" as a live guide item results in two setting items on the super control screen 20, namely "white balance" and "tone".

In this way, with this embodiment, as was described using FIG. 3 to FIG. 7, together with understanding the appearance of operation screens being switched between the super control screen 20, live control screen 30 and live guide screen 40, it is possible to grasp at a glance what position on an operation screen after switching a setting item that was selected on an operation screen before switching has moved to. This makes it possible for the user to immediately carry on with their setting task.

Figure 8:
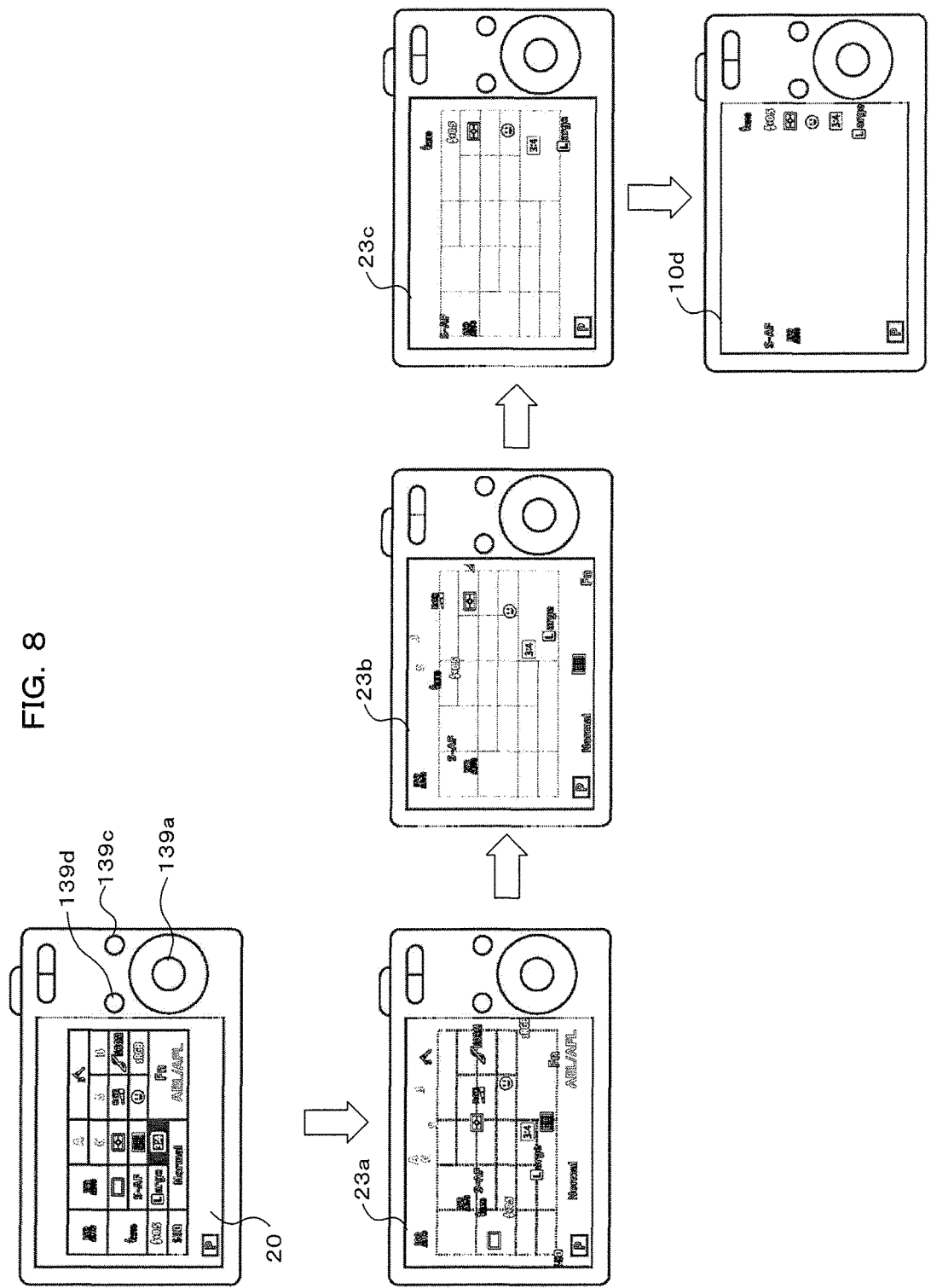
FIG. 8 is a drawing showing display appearance for switching from a super control screen to a shooting standby screen, in the camera of one embodiment of the present invention.

Next, change from a state where an operation screen is being displayed to a shooting standby screen will be described using FIG. 8. With the example shown in FIG. 8, the super control screen 20 is being displayed as an operation screen. If the operation member 139c or 139c is operated in this state (this is not limiting, and may be another operation member such as the operation member 139a, for example), the shooting standby screen 10d shown at the bottom right of FIG. 8 is returned to. In this case also, the shooting standby screen 10d is not returned to immediately, and there is a change to the shooting standby screen 10d after passing through the transition screens 23a, 23b, and 23c.

In the screen transitions, frames of the table for the super control screen 20 are gradually faded out but the currently set values for each setting item are gradually moved to corresponding positions of the shooting standby screen 10d. With the example of FIG. 8, AF method (S-AF representing single AF) and set ISO sensitivity are moved to the left side of the screen, while flash method, exposure correction, photometry method, aspect ratio, and number of pixels etc. are moved to the right side of the screen (refer to transition screens 21a, 21b, and 21c). As a result, the user can easily know setting values that have been set on the operation screen using the transition screens.

With one embodiment of the present invention, as transition screens at the time of changing operation screens, operations screens are rotated by taking one side of each operation screen as a rotational axis, and change of the operation screen is rendered so as to extract part of the screen at this time. However, this is not limiting, and it is also possible, for example, to link all operation screens with a single axis, and carry out operation screen switching while displaying the whole of all operation screens. This first modified example will be described using FIG. 9.

Figure 9:
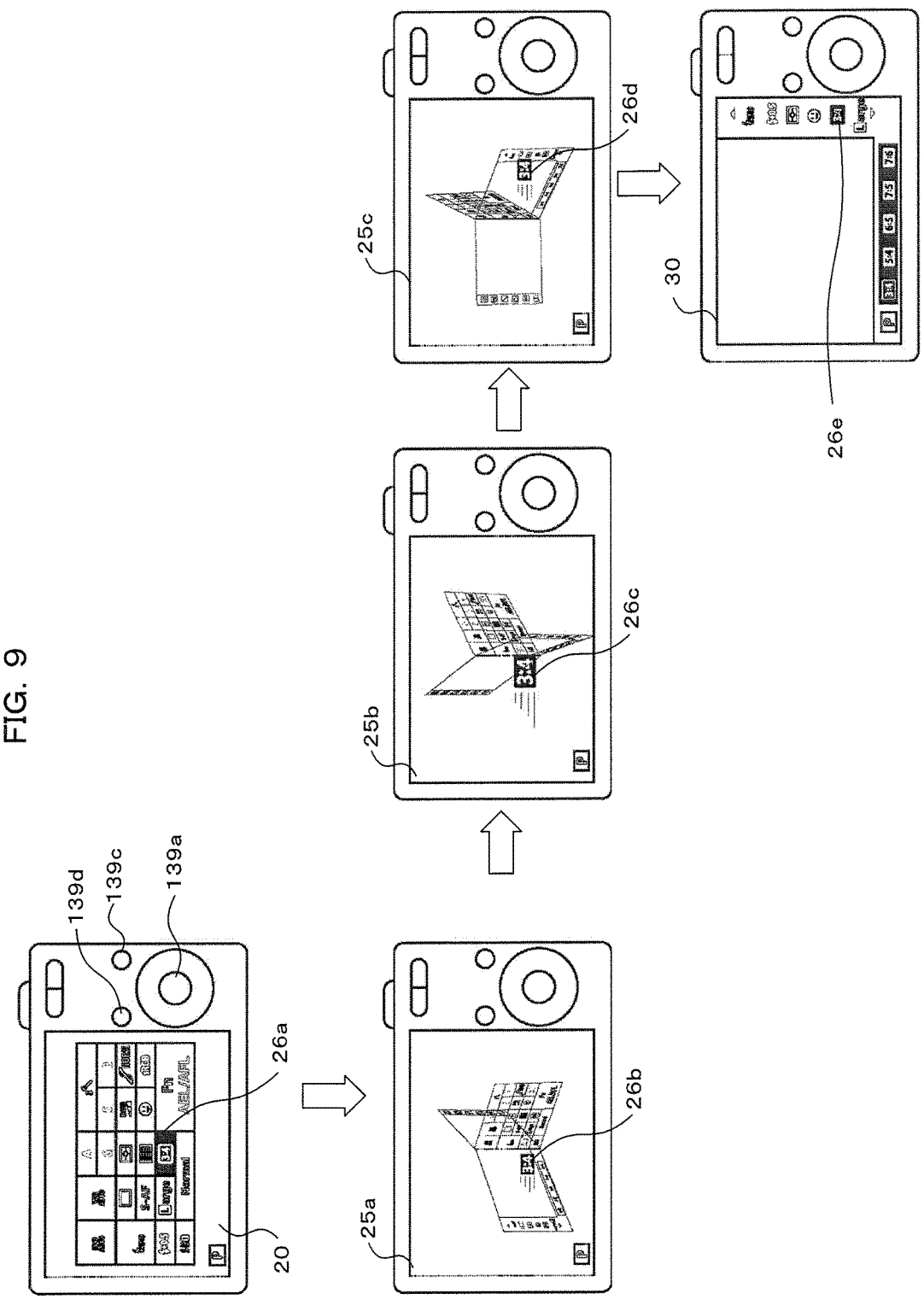
FIG. 9 is a drawing showing a first modified example (full display) of display appearance for switching from a super control screen to a live control screen, in the camera of one embodiment of the present invention.

In the example shown in FIG. 9, the super control screen 20 is displayed on the display 137 and aspect ratio 26a is being selected by the user. If the operation member 139d is operated in this state, there is a change to the live control screen 30 shown lower right in FIG. 9, but there is not an immediate change to the live control screen 30 but a change to the live control screen 30 after passing through transition screens 25a, 25b and 25c.

In transitioning of screens, with this modified example, shorter edges of the super control screen 20, live control screen 30, and live guide screen 40 are linked to one edge, a combined operation screen that rotates with this shorter edge as a rotational axis is displayed, and with change through the transition screens 25a to 25c the combined operation screen is also displayed rotating (refer to transition screens 25a, 25b, 25c). Then, if the live control screen 30 that is to be changed to approaches the forward facing position, it is enlarged to become the live control screen 30 shown at the lower right of FIG. 9.

Also, when transitioning, display is performed so that change in position of the setting item on the transition screens 25a, 25b, and 25c can be grasped, so that it can be known what position setting items that have been selected on the super control screen 20 have been moved to in the live control screen 30. In the example shown in FIG. 9, aspect ratio 26a has been selected on the super control screen 20. If the operation member 139d is operated in this state, the aspect ratio 26a is moved to position 26b in transition screen 25a, position 26c in transition screen 25b, and position 26d in transition screen 25*c*, and it is grasped that it has moved to position 26*e* in the live control screen 30.

In this way, with the first modified example of the transition screens shown in FIG. 9 also, together with understanding the appearance of operation screens being switched between the super control screen 20, live control screen 30 and live guide screen 40, it is possible to grasp at a glance what position, on an operation screen after change, a setting item that was selected on an operation screen before change has moved to. This makes it possible for the user to immediately carry on with their setting task. Also, with this modified example, all operation screens are displayed at the time of switching a plurality of operation screens, which means that it is easy to know operation screens that can be switched and operation becomes easier.

Next, a second modified example of the transition screens will be described using FIG. 10. In the first modified example described previously, the whole of a combined operation screen that had been obtained by linking all operation screens at the time of transition were displayed, but with the second modified example the operation screens are displayed as if they were sliding at the time of transition.

Figure 10:
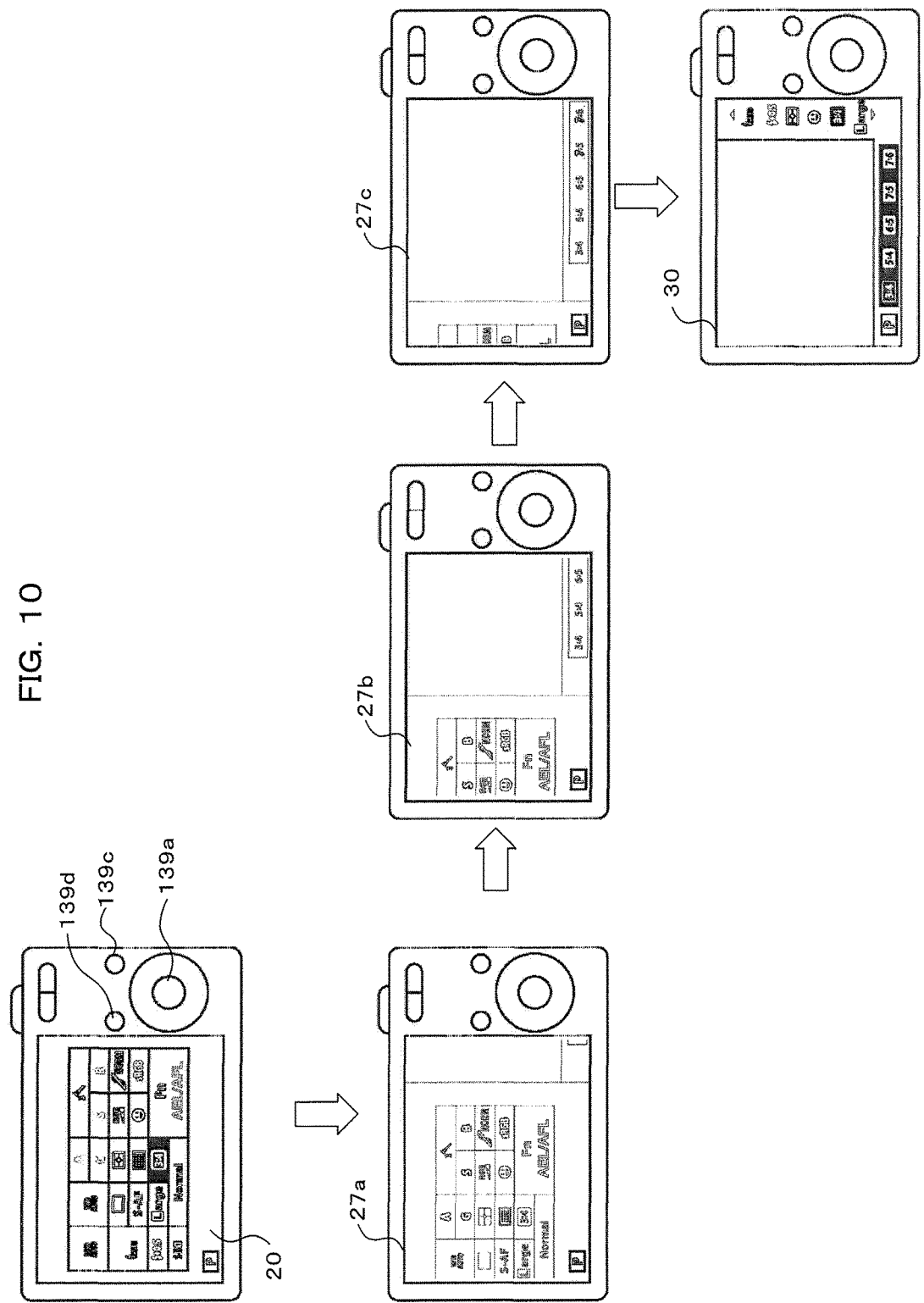
FIG. 10 is a drawing showing a second modified example (slide) of display appearance for switching from a super control screen to a live control screen, in the camera of one embodiment of the present invention.

In the example shown in FIG. 10, the super control screen 20 is displayed on the display 137, and if the operation member 139*d* is operated in this state, there is a change to the live control screen 30 shown lower right in FIG. 10, but there is not an immediate change to the live control screen 30 but a change to the live control screen 30 after passing through transition screens 27*a*, 27*b* and 27*c*.

At the time of screen transition, with this modified example the super control screen 20 is displayed so as to slide to the left side of the screen, and a display section for setting items of the live control screen 30 is displayed so as to slide out from the right side of the screen (refer to transition screens 27*a*, 27*b*, and 27*c*).

When transitioning, as was described previously, display is performed so that change in position of the setting item on the transition screens 27*a*, 27*b*, and 27*c* can be grasped, so that it can be known what position setting items that have been selected on the super control screen 20 have been moved to in the live control screen 30.

In this way, with the second modified example of the transition screens shown in FIG. 10 also, the appearance of operation screens being switched between the super control screen 20, live control screen 30 and live guide screen 40 is understood.

Next, a third modified example of the transitional screens will be described using FIG. 11. With the previously described second modified example, display at the time of transition was performed so that the operation screen appears to slide, but with this third modified example, at the time of transition fade in/fade out display of the operation screens is performed.

Figure 11:
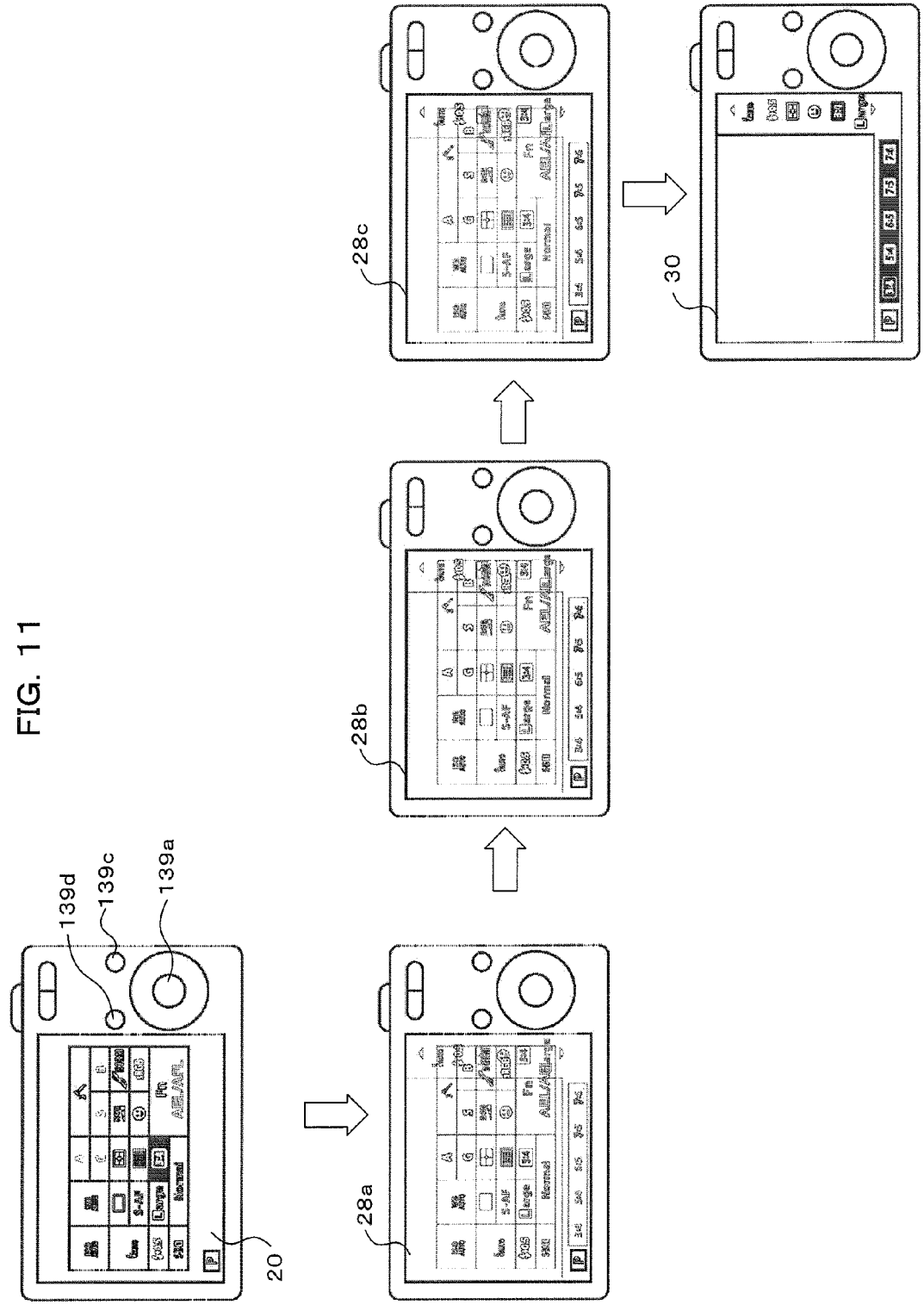
FIG. 11 is a drawing showing a third modified example (fade in/fade out) of display appearance for switching from a super control screen to a live control screen, in the camera of one embodiment of the present invention.

In the example shown in FIG. 11, the super control screen 20 is displayed on the display 137, and if the operation member 139*d* is operated in this state, there is a change to the live control screen 30 shown lower right in FIG. 11, but there is not an immediate change to the live control screen 30 but a change to the live control screen 30 after passing through transition screens 28*a*, 28*b* and 28*c*.

At the time of screen transition, with this modified example, the super control screen 20 is displayed so as to gradually becomes fainter (fade out), while the live control screen 30 is displayed so as to gradually become darker (fade in), and finally the super control screen 20 disappears and only the live control screen 30 is displayed (refer to transition screens 28*a*, 28*b*, and 28*c*).

When transitioning, as was described previously, display is performed so that change in position of a setting item on the transition screens 28*a*, 28*b*, and 28*c* can be grasped, so that it can be known what position setting items that have been selected on the super control screen 20 have been moved to in the live control screen 30.

In this way, with the third modified example of the transition screens shown in FIG. 11 also, the appearance of operation screens being switched between the super control screen 20, live control screen 30 and live guide screen 40 is understood.

Next, a fourth modified example of the transitional images will be described using FIG. 12. With the previously described third modified example, display at the time of transition was performed so that the operation screens fade in/fade out, but with this fourth modified example at the time of transition zoom in display of the operation screens is performed.

Figure 12:
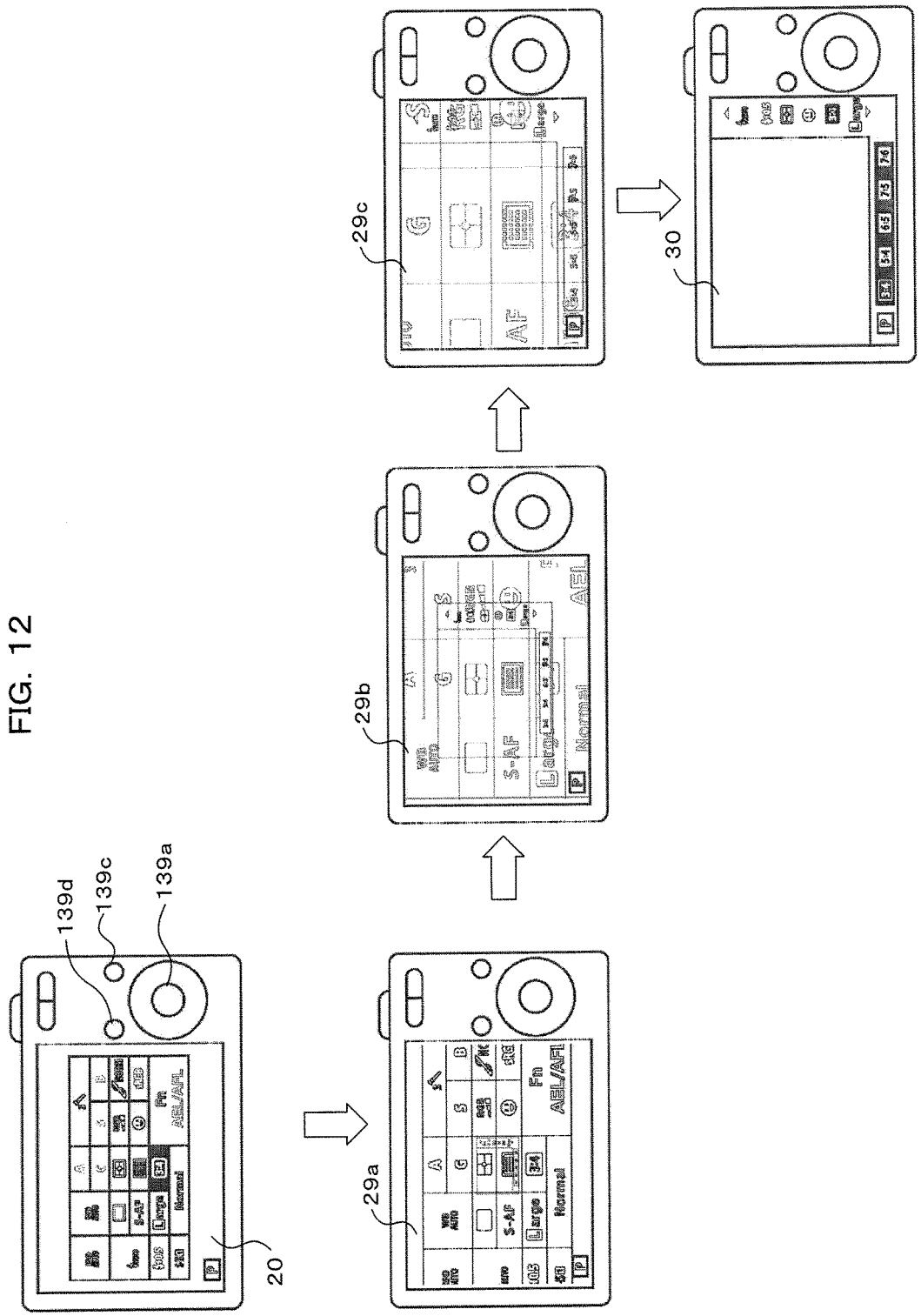
FIG. 12 is a drawing showing a fourth modified example (zoom in) of display appearance for switching from a super control screen to a live control screen, in the camera of one embodiment of the present invention.

In the example shown in FIG. 12, the super control screen 20 is displayed on the display 137, and if the operation member 139*d* is operated in this state, there is a change to the live control screen 30 shown lower right in FIG. 12, but there is not an immediate change to the live control screen 30 but a change to the live control screen 30 after passing through transition screens 29*a*, 29*b* and 29*c*.

At the time of screen transition, with this modified example, the super control screen 20 is displayed so as to gradually be enlarged (zoom in) while the image gradually becomes fainter, and the live control screen 30 is also displayed so as to gradually be enlarged from a point (zoom in), and finally the super control screen 20 disappears and the live control screen 30 is displayed at the size of the display 137 (refer to transition screens 29*a*, 29*b*, and 29*c*).

When transitioning, as was described previously, display is performed so that change in position of a setting item on the transition screens 29*a*, 29*b*, and 29*c* can be grasped, so that it can be known what position setting items that have been selected on the super control screen 20 have been moved to in the live control screen 30.

In this way, with the fourth modified example of the transition screens shown in FIG. 12 also, the appearance of operation screens being switched between the super control screen 20, live control screen 30 and live guide screen 40 is understood.

Next, a fifth modified example of the transition screens will be described using FIG. 13. With one embodiment of the present invention, setting items that have been selected by the user move within transition screens, so that a position corresponding to the next operation screen will be grasped. This fifth modified example is not limited to a setting item that has been selected by the user and setting values for all setting items are moved within transition screens, so that positions corresponding to the next operation screen are understood.

In the example shown in FIG. 13, the super control screen 20 is displayed on the display 137, and if the operation member 139*d* is operated in this state, there is a change to the live control screen 30 shown lower right in FIG. 13, but there is not an immediate change to the live control screen 30 but a change to the live control screen 30 after passing through transition screens 51*a*, 51*b* and 51*c*.

In screen transitioning, with this modified example, similarly to the transition of operation screens that was described using FIG. 3, the screens are made to appear as if pages were being turned, with the left edge of a screen of a table in the super control screen 20 and a left edge of the live control screen 30 being made an axial center, that is, display is carried out so that the page of the super control screen 20 is dismissed so it can no longer be seen, and then the live control screen 30, which is the next page, comes into view (refer to transition screens 51a, 51b and 51c).

Also, when transitioning, display is performed so that change in position of the setting items on the transition screens 51a, 51b, and 51c can be grasped, so that it can be known what position setting values of all setting items have been moved to in the live control screen 30, without limiting to a setting item that has been selected on the super control screen 20.

In this way, with the fifth modified example, for all setting items, when changing the operation screens, change in position of those setting items is displayed, and so it is easy to understand a correspondence relationship before and after switching of the operation screens. In FIG. 13, change in operation screen has been changed using rotation around a rotational axis, but this is not limiting, and this modified example may also be applied to cases where change is displayed using the slide method as was shown in FIG. 10, the fade in method as was shown in FIG. 11, the zoom in method as was shown in FIG. 12 etc., or another method. This modified example may also be applied to a case such as was shown in FIG. 7 where all operation screen were displayed as transition screens.

Next, a first aspect of the first modified example relating to moving display of setting items will be described using FIG. 14A. In the above-described one embodiment and modified examples of the present invention, transition screens for movement of operation screens before and after switching of the operation screens were displayed (refer to FIG. 3 to FIG. 13). With this first aspect of the modified example, transition screens for moving operation screens are omitted, and display is performed so that only movement of setting values of setting items is understood.

In the example shown in FIG. 14A, the super control screen 20 is displayed on the display 137, and if the operation member 139d is operated in this state, there is a change to the live control screen 30 shown lower right in FIG. 14A. However there is not an instantaneous change to the live control screen 30 but first a super control screen 20A that has faint frame lines and setting items is displayed, and at this time movement starts of only a setting item that has been selected by the user towards a position corresponding to the live control screen 30, which is the next operation screen.

If movement of a setting item that has been selected by the user from the super control screen 20A is commenced, a live control screen 30A is displayed, and the selected setting item reaches a corresponding icon position in the live control screen 30. In the example shown in FIG. 14A, aspect ratio 21A is being selected on the super control screen 20. If the user operates the operation member 139d in this state, the aspect ratio 21A moves from position 21B to position 21C, and stops at the position of aspect ratio 21D on the live control screen 30.

In this way, with the first aspect of the first modified example relating to moving display of a setting item, transition screens for moving operation screens before and after operation screen switching are not displayed, but a setting value of a setting item that has been selected by the user is moved towards a corresponding position of the setting item in an operation screen after switching, which is advantageous in that it is possible to easily confirm the corresponding setting item on the operation screen after switching.

With this modified example, only an item that has been selected by the user is moved, and position of a corresponding setting item before and after switching of operation screens can be understood, but this is not limiting, and it is also possible to move all setting items or a plurality of setting items.

Figure 14B:
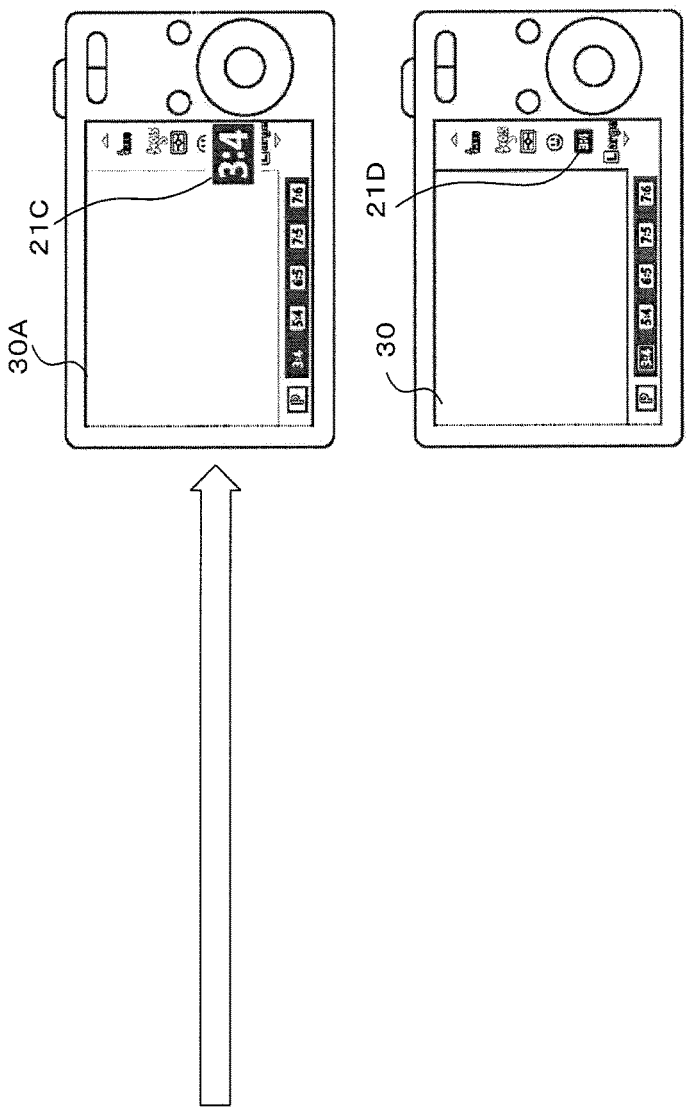
FIG. 14B is a drawing showing a second aspect of the first modified example showing change in position of setting items when switching from a super control screen to a live control screen, in the camera of one embodiment of the present invention.

Next, a second aspect of the first modified example relating to moving display of setting items will be described using FIG. 14B. The second aspect is also similar to the first embodiment in that before and after switching of the operation screens position of the aspect ratio 21A setting item is moved (position 21A→position 21B→position 21C→position 21D). However, the second aspect differs from the first aspect in that the size of the display becomes larger for positions 21B and 21C.

Figure 14E:
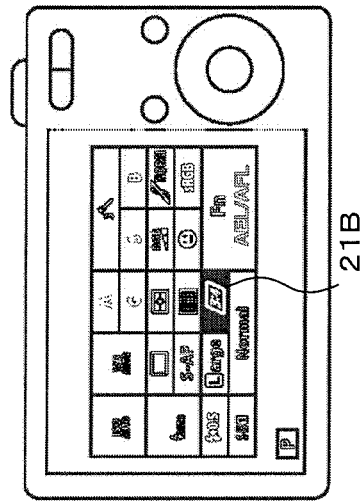
FIG. 14C to FIG. 14E are drawings showing another example of the second aspect of the first modified example, showing change in position of setting items when switching from a super control screen to a live control screen, in the camera of one embodiment of the present invention.
Figure 14C:
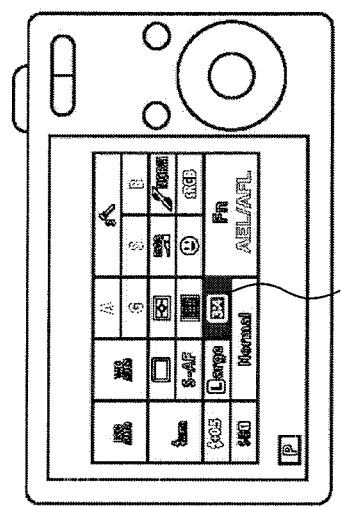
Figure 14D:
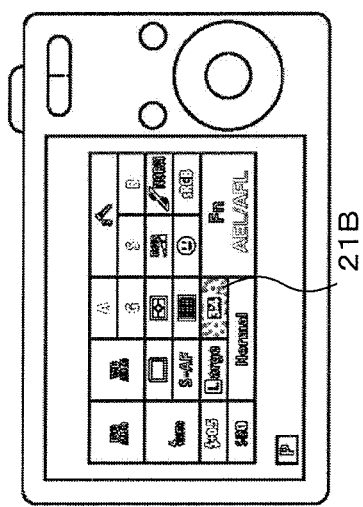

With this aspect, the size of the item that has been selected by the user is changed and displayed position of a corresponding setting item before and after switching of the operation screens can be understood, but this is not limiting, and it is also possible, for example, to make it possible to understand display position by having highlighted display as shown in FIG. 14C, by varying the color as shown in FIG. 14D, and by varying inclination of characters as shown in FIG. 14E. In FIG. 14C-FIG. 14E setting items before transition are shown, and during transition they are changed as shown in FIG. 14B. Also, FIG. 14C is the same setting item as was shown in FIG. 14B.

Next, a second modified example relating to moving display of setting items will be described using FIG. 15. With the one embodiment and modified examples of the present invention described above, setting items corresponding to setting items that have been selected by the user also exist in an operation screen after switching. However, since the live control screen 30 only has a few guide items displayed, there may be situations where such guide items are hidden on the operation screen after switching and not displayed. With this modified example, a setting item display section of the live control screen 30 is scrolled, so as to display corresponding setting items.

Figure 15:
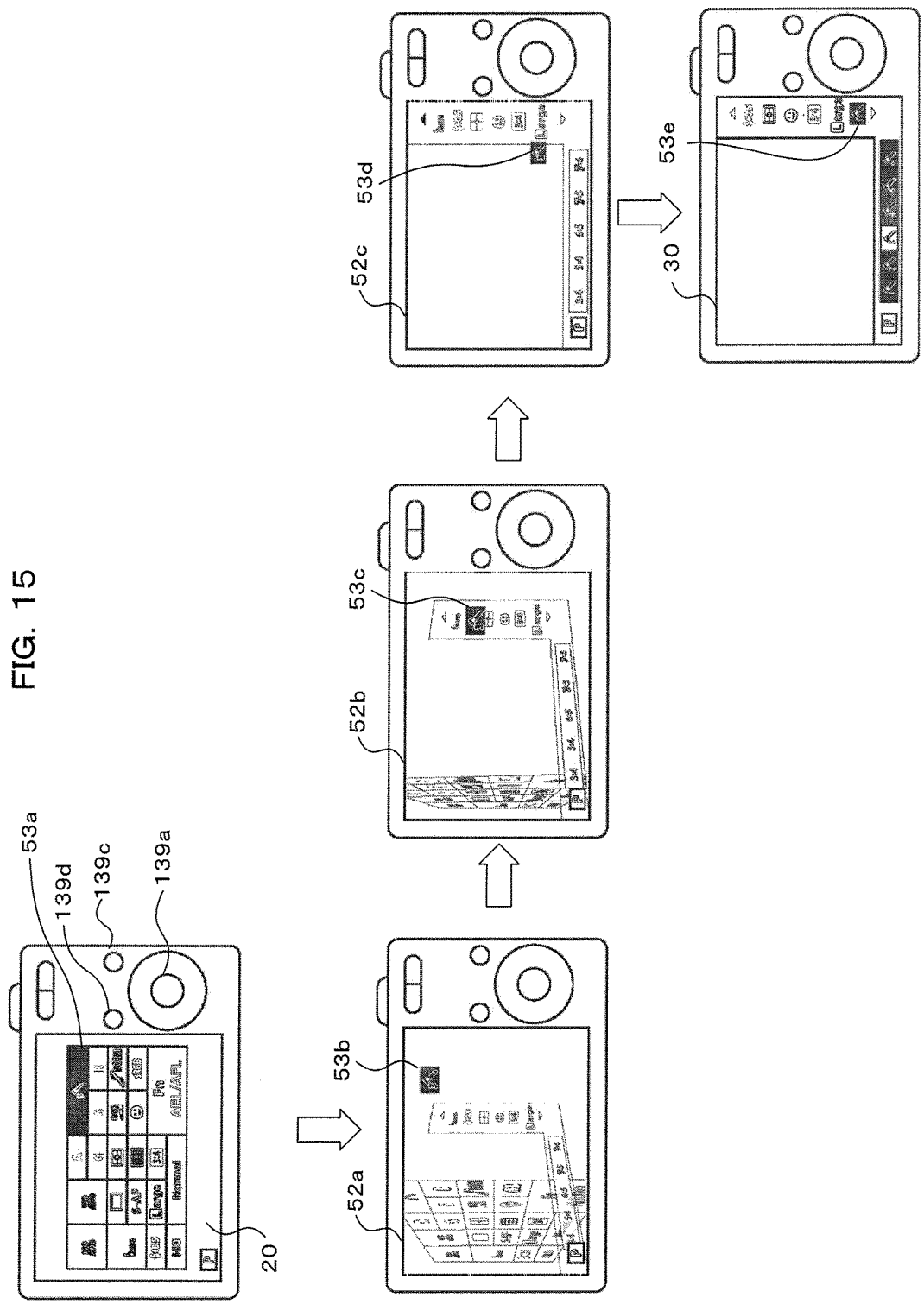
FIG. 15 is a drawing showing the first modified example, showing change in position of setting items when switching from a super control screen to a live control screen, in the camera of one embodiment of the present invention.

FIG. 15 shows display appearance when changing from the super control screen 20 to the live control screen 30. If the operation member 139d is operated on the super control screen 20 shown at the upper left of FIG. 15, there is a change to the live control screen 30 shown lower right in FIG. 15, but there is not an immediate change to the live control screen 30 but a change to the live control screen 30 after passing through transition screens 52a, 52b and 52c.

In screen transitioning, similarly to the case shown in FIG. 3, the screens are changed so as to appear as if pages were being turned, with the left edge of a screen of a table in the super control screen 20 and a left edge of the live control screen 30 being made an axial center, that is, display is carried out so that the page of the super control screen 20 is dismissed so it can no longer be seen, and then the live control screen 30, which is the next page, comes into view (refer to transition screens 52a, 52b and 52c).

Also, when transitioning, display is performed so that change in position of the setting item on the transition screens 52a, 52b, and 52c can be grasped, so that it can be known what position the setting item that have been selected on the super control screen 20 have been moved to in the live control screen 30. Once the live control screen 30 has been displayed on the screen of the display 137, the setting item stops at a corresponding setting item position for this screen. However, in the event that corresponding setting item is concealed and not displayed, setting items are scrolled, and after the corresponding setting item appears the setting item that has been moved is stopped at this position.

In the example shown in FIG. 15, picture mode 53a is being selected on the super control screen 20. If the operation member 139d is operated in this state, the picture mode 53a moves to positions 53b, 53c and 53d in transition screens 52a-52c. Since the picture mode is not displayed on the live control screen 30, as shown in transition screen 52c, setting items of the live control screen are scrolled, and picture mode is displayed and stopped at position 53e.

In this way, with the second modified example relating to moving display of setting items, in a case where setting items corresponding to an operation screen after switching of the operation screens are concealed and not displayed, corresponding setting items are displayed, so that setting values of setting items that have been selected by the user are also displayed on the operation screen after switching. As a result there is the advantage that it is possible to easily confirm corresponding setting items on the operation screen after switching.

With this modified example, change in operation screen has been changed using rotation around a rotational axis, but this is not limiting, and this modified example may also be applied to cases where change is displayed using the slide method as was shown in FIG. 10, the fade in method as was shown in FIG. 11, the zoom in method as was shown in FIG. 12 etc., or another method. Also, with this modified example, only an item that has been selected by the user is moved, and position of a corresponding setting item before and after switching of operation screens can be understood, but this is not limiting, and it is also possible to move a plurality of setting items.

Next, operation of one embodiment and the modified examples of the present invention will be described using the flowcharts shown in FIG. 16 to FIG. 18. These flowcharts are executed by a CPU within the control circuit 150, based on programs stored in the flash memory 133. This processing flow is described centering on processing related to display of operation screens, within a shooting operation.

Figure 16:
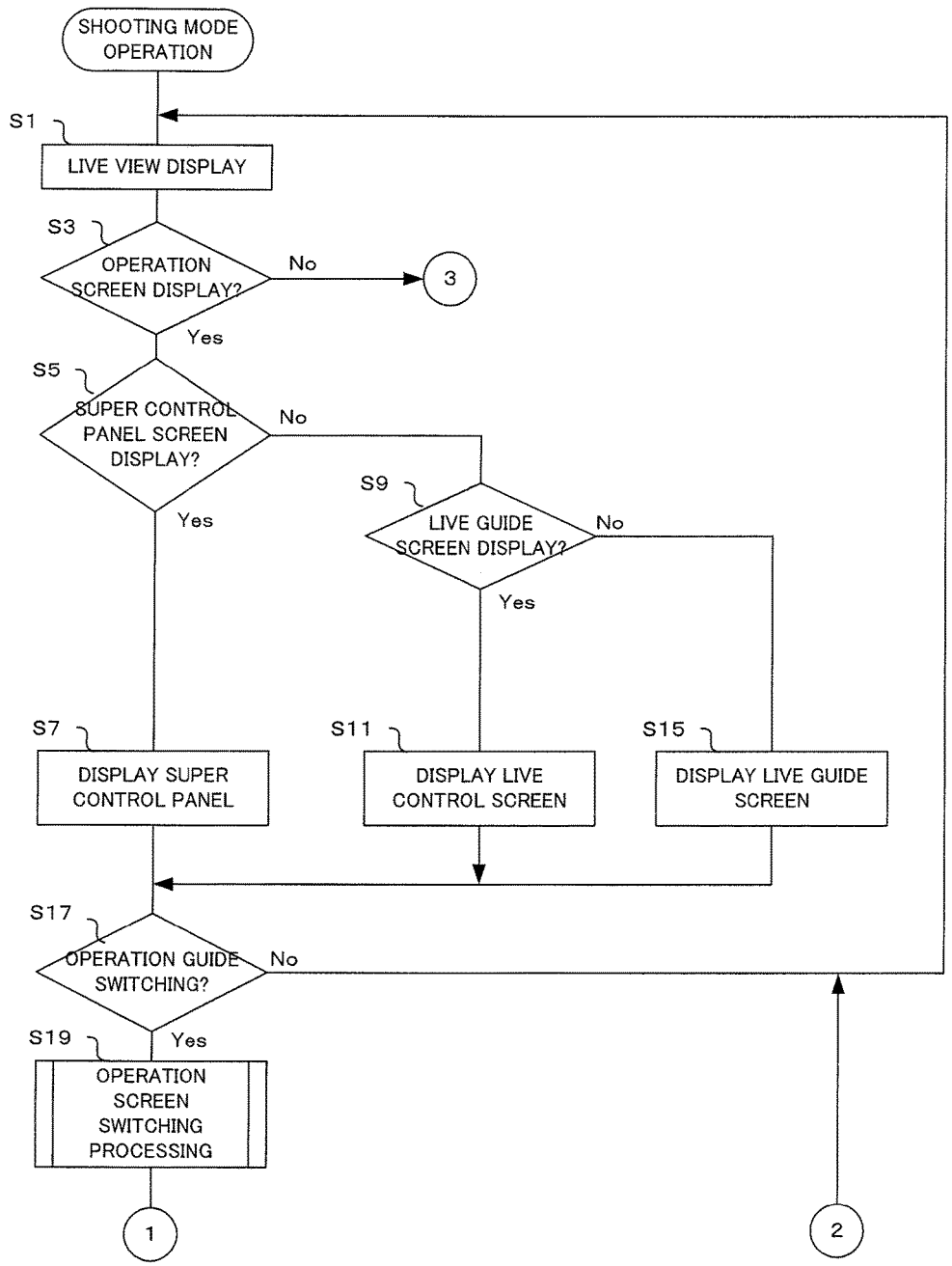
FIG. 16 is a flowchart showing shooting operation, in the camera of one embodiment of the present invention.
Figure 17:
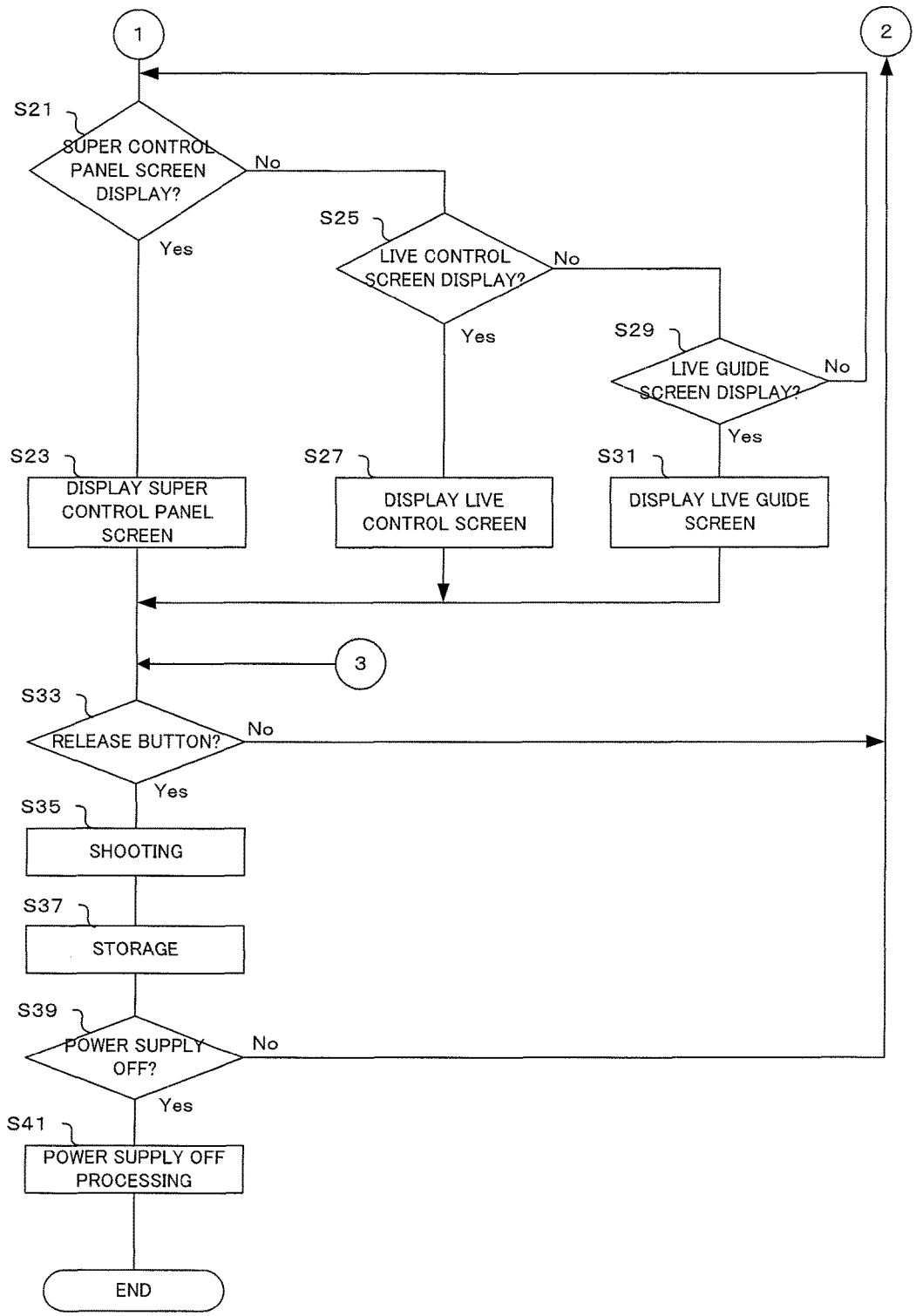
FIG. 17 is a flowchart showing shooting operation, in the camera of one embodiment of the present invention.

First, if the shooting mode operation shown in FIG. 16 is entered, live view display is carried out (S1). Here, image data from the image sensor 119 is subjected to image processing for live view display, and a live view image is displayed on the display 137 by mean of the control circuit 150 and the display control circuit 135. By monitoring the live view display, the user confirms composition, and decides on when to press the shutter release. Also, in response to a half press operation of the release button, the AF control section 155 carries out automatic focus adjustment for the photographing lens 111, and the AE control section 157 calculates control values such as shutter speed of the shutter 113 and aperture value of the aperture 115 to achieve correct exposure.

If live view display has been carried out it is next determined whether or not operation screen display will be carried out (S3). As was described using FIG. 2, if the operation member 139a within the operation section 139 is operated an operation screen corresponding to a shooting mode being set is displayed. In this step determination is therefore based on whether or not the operation member 139a has been operated. If the result of this determination is not operation screen display, processing advances to step S33 which will be described later, and operations for shooting are carried out.

If the result of determination in step S3 is operation screen display, it is determined whether or not an instruction for operation screen display is super control screen display (S5). Since there is a switch to the super control screen if the operation member 139a is operated in a case where shooting mode A is set, as described previously, in this step determination is based on the shooting mode.

If the result of determination in step S5 is super control screen display, the super control screen is displayed (S7). Here, the super control screen 20 that was shown in FIG. 2 is displayed on the display 137. Once display of the super control screen has been carried out, the user selects from among each of the setting items and can change setting content.

If the result of determination in S5 is not display of the super control screen, it is determined whether or not it is live guide screen display (S9). Since there is a switch to the live control screen if the operation member 139a is operated in a case where shooting mode B is set, as described previously, in this step determination is based on the shooting mode.

If the result of determination in step S9 is live guide screen display, the live guide screen is displayed (S15). Here, the live guide screen 40 that was shown in FIG. 2 is displayed on the display 137. Once display of the live guide screen has been carried out, the user selects from among each of the setting items and can change setting content.

If the result of determination in step S9 is not live guide screen display, the live control screen is displayed (S11). Here, the live control screen 30 that was shown in FIG. 2 is displayed on the display 137. Once display of the live control screen has been carried out, the user selects from among each of the setting items and can change setting content.

If display of an operation screen has been carried out in step S7, S11 or S15, it is next determined whether or not there is operation screen switching (S17). If the operation member 139c or 139d is operated, switching of operation screens is carried out cyclically. In this step determination is therefore based on whether or not the operation member 139c or 139d has been operated. If the result of this determination is that an operation screen will not be switched to, processing returns to step S1.

On the other hand, if the result of determination in S17 is that an operation screen has been switched to, operation screen switching processing is carried out (S19). Here, switching processing for operation screens is performed, and as was described using FIG. 3 to FIG. 15, transition screens etc. are displayed in various display appearances. Detailed operation of this operation screen switching processing will be described later using FIG. 18.

If operation screen processing has been carried out, it is next determined whether or not there is super control screen display (S21). As was described previously, if an operation screen has been displayed once, it is determined whether or not an operation screen after switching is the super control screen in response to operation of the operation member 139c or 139d.

If the result of determination in step S21 is super control screen display, super control screen display is carried out (S23). Here, as was shown in FIG. 4 etc., display of the super control screen is carried out as an operation screen. Once display of the super control screen has been carried out, the user selects from among each of the setting items and can change setting content.

If the result of determination in S21 is not display of the super control screen display, it is determined whether or not it is live control screen display (S25). In this step it is determined whether or not an operation screen after switching in response to operation of the operation member 139c or 139d is the live control screen.

If the result of determination in step S25 is live control screen display, live control screen display is carried out (S27). Here, as was shown in FIG. 3 etc., display of the live control screen is carried out as an operation screen. Once display of the live control screen has been carried out, the user selects from among each of the setting items and can change setting content.

If the result of determination in S25 is not display of the live control screen display, it is determined whether or not it is live guide screen display (S29). In this step it is determined whether or not an operation screen after switching is the live guide screen in response to operation of the operation member 139c or 139d. If the result of this determination is not live guide screen display, processing returns to step S21.

If the result of determination in step S29 is live guide screen display, live guide screen display is carried out (S31). Here, as was shown in FIG. 5 section, the live guide screen is displayed as an operation screen. Once display of the live guide screen has been carried out, the user selects from among each of the setting items and can change setting content.

If display of operation screen has been carried out in step S23, S27 or S31, is next determined whether or not the release button has been operated (S33). Since the camera enters a shooting operation if the release button within the operating section 139 is operating, determination in this step is based on operating state of the release button. If the result of this determination is that a full press operation of the release button has not been performed, processing returns to step S1.

If the result of determination in step S33 is that a full press operation of the release button has been performed, shooting is carried out (S35). Here control for the shutter 113 etc. is carried out, and the image sensor 119 carries out imaging of a subject image. Once shooting is been carried out, a resulting image is stored (S37). Here, image data is read out from the image sensor 119, the image processing circuit 121 carries out image processing for storage, and the processed data is stored in the storage section 131.

Once storage has been carried out, it is next determined whether or not the power supply has been turned off (S39). It is determined whether or not a power switch within the operation section 139 has been powered off. If the result of this determination is not power off, processing returns to step S1. On the other hand if the result of determination is power off, power off processing is carried out and this flow is terminated.

In this way, in the flow for a shooting operation, the switching display for transition screens etc. that was described in FIG. 3-FIG. 15 is carried out in step S19. As a result of this switching display, it becomes easy for the user to understand the relationship between setting items before switching and setting items after switching.

Next, detailed operation of the operation screen switching processing in step S19 will be described using the flowchart shown in FIG. 18. This processing flow is for carrying out display of transition screens etc. when switching operation screens.

If the flow for operation screen switching processing is entered, it is first determined whether or not a plurality of operation screen, among all of the operation screen, are displayed at the same time (S51). For example, it is determined whether or not all of a plurality of operation screens are displayed as transition screens, as was shown in FIG. 9. With this embodiment determination is based on the shooting mode that is set. Specifically, since a suitable display appearance is stored in advance in the flash memory 133 for each shooting mode, determination depends on that shooting mode, and similar determination is carried out in steps S53, S55 and S57.

If the result of determination in step S51 is Yes, a plurality of operation screens, among all of the operation screens, are simultaneously displayed (S61). With the setting in this step, a plurality of operation screens are displayed at the same time as transition screens, as was shown in FIG. 9 for example. With the example that was shown in FIG. 9, all of the operation screens were displayed simultaneously, but three or more operation screens may be displayed.

If the result of determination in step S51 is No, it is determined whether or not to display screens for switching from and to operation screens (S53). For example, it is determined whether or not to display two or less operation screens between transitions, as shown in FIG. 3-FIG. 7, FIG. 9-FIG. 13 and FIG. 15 etc. With this embodiment determination is based on the shooting mode that is set.

If the result of determination in step S53 is operation screen mid-switching display, interim screen display is carried out (S63). Here, as shown in FIG. 3-FIG. 7, FIG. 9-FIG. 13 and FIG. 15 etc. a switching screen is displayed while simultaneously displaying two or less operation screens between transitions.

Once screen display has been carried out in step S61 or step S63, or of the result of determination in step S53 was No, it is next determined whether or not change in setting item display position will be displayed (S55). For example, in FIG. 3 aspect ratio 22a-22e moves between transition screens, and it is determined whether or not to display so that it is easy to visually realize change in display position of the setting items. With this embodiment determination is based on the shooting mode that is set.

If the result of determination in step S55 is Yes, change in setting item display position is displayed (S65). Here, at the time of switching from an operation screen before switching to an operation screen after switching, having passed through screens such as transition screens, display is carried out so that change in display position of the setting items can be understood. As this display appearance, as shown in the embodiments, a setting item that has been selected by the user, all setting items, or a plurality of setting items may be moved independently, or a display appearance may be adopted from among various display appearances, such as displaying a movement trace for a specified time.

Once change in display position for the setting item has been displayed in step S65, or if the result of determination in step S55 was No, it is determined whether or not to carry out display of a setting item differently to other setting items (S57). Here it is determined whether or not a setting item after switching, corresponding to a setting item being selected before and after switching of the operation screens, will be displayed differently to other setting items. With this embodiment determination is based on the shooting mode that is set.

If the result of determination in step S57 is Yes, a setting item is displayed differently to other setting items (S67). Display of the setting item that has been selected by the user before switching is displayed differently to other items. As display that is different to other items, processing is carried out to, for example, perform highlighted display of that setting item, perform scaling display, change the color or change the character style etc. As a result it is possible to easily recognize what position a selected setting item is at after switching.

Once display of a setting item differently to other setting items has been carried out in step S67, or if the result of determination in step S57 was No, the flow for operation screen switching processing is completed and the originating flow is returned to.

In this way, with the switching processing for operation screens of this embodiment, display is carried out for transitional images etc. before and after switching of operation screens. With the transitional screens before and after this switching, all operation screen or some (a plurality of) operational images are displayed, so that change in setting items is understood (refer to S61, S63). By displaying change in position of a particular setting item (refer to S65), it is possible to make it easy to understand a correspondence relationship between setting items before and after switching of operation screens.

With this embodiment, the determinations in steps S51, S53, S55 and S57 are performed so as to carry out suitable display in accordance with a shooting mode that is set. However, this is not limiting and other determination conditions may be used, and the user may also set a preferred display appearance using a menu screen.

As has been described above, with the one embodiment and the modified examples of the present invention, there are provided a display control circuit 115 for displaying operation screens (for example, the super control screen 20, live control screen 30 and live guide screen 40) for selecting setting items to be used, from among a plurality of setting items that are provided, on the display 137, and displaying a plurality of operation screens simultaneously when switching from an operation screen to another operation screen, and an operation section (for example, operation member 139c, operation member 139d) that is operated in order to switch from an operation screen to another operation screen, with the plurality of operation screens being screens that have at least some setting items that are the same but that have different display formats (for example, display formats are different for the super control screen 20, the live control screen 30 and the live guide screen 40). As a result, when operation screens have been switched, it is easy to understand that there has been a change to the same hierarchical layer or the same operation screen.

Also, with the one embodiment and modified examples of the present invention, the display control circuit displays change in display appearance of setting items when switching from an operation screen to another operation screen (for example, changes to 22a, 22b, 22c, 22d and 22e in FIG. 3). As a result, a relationship between display positions before and after switching of the operation screens is easily understood Also, with the one embodiment and modified examples of the present invention, there are provided display steps for displaying operation screens for selecting setting items to be used, from among a plurality of setting items that are provided, on a display (for example, S7, S11 and S15 in FIG. 16), an operation detection step for detecting whether on operation for switching from an operation screen to another operation screen has been performed (for example, S17 in FIG. 16), and a display switching step for, when it has been detected in the operation detection step that an operation for switching has been performed, displaying a plurality of operation screens simultaneously at the time of switching from an operation screen to another operation screen, the plurality of operation screens being screens that have at least some setting items that are the same, but have different display formats (for example, S19 in FIG. 16, and all of FIG. 18). As a result, when operation screens have been switched, it is easy to understand that there has been a change to the same hierarchical layer or the same operation screen.

Also, with the one embodiment and modified examples of the present invention, a display switching step is provided for, when it has been detected in the operation detection step that an operation for switching has been performed, allowing display of switching from an operation screen to another operation screen (S19 in FIG. 16 and the whole of FIG. 18), and this display switching step displays change in display appearance of setting items when switching from one operation screen to another operation screen (for example, S65 in FIG. 18). As a result, a relationship between display positions before and after switching of the operation screens is easily understood With this embodiment, the operation screens have been exemplified by the super control screen 20, live control screen 30 and live guide screen 40, but this is not limiting, and the number of operation screens may be further increased, or some of them may be omitted. Also, with the embodiments, description has not been given for all switching combinations of these operation screens, but similar switching is possible, and the modified examples can also be similarly applied, or appropriately combined.

Further, with this embodiment, a device for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), personal computer (PC) tablet type computer, game console etc. The present invention may also be applied to a device that does not have a picture taking function as long as it is a device that has operation screens.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A display device having a display, comprising:
a display control circuit for causing either a first operation screen, for selection of setting items to be used from among a plurality of provided setting items, or a second operation screen, including at least one setting item that is different to those of the first operation screen, and in which arrangement positions of the setting items are different to those of the first operation screen, to be displayed on the display, and causing switching from the first operation screen to the second operation screen to be displayed, wherein the first operation screen displays a plurality of setting items on almost all portions within a screen, and the second operation screen displays a plurality of setting items only at portions close to one or more edges within the screen; and an operation member for operating in order to switch from the first operation screen to the second operation screen in response to selecting one of the plurality of setting items, wherein the operation member is a button or touch screen, and wherein the selection of the one of the plurality of setting items is performed by pressing the button or touching a setting item displayed on the first operation screen, wherein the display control circuit causes display of change in display appearance of the setting items, when there is a switch from the first operation screen to the second operation screen, by (1) generating a plurality of transition screens that are different from both the first operation screen and the second operation screen, in order to show change from the first operation screen to the second operation screen, and (2) sequentially displaying the plurality of transition screens.

2. The display device of claim 1, wherein:
the display control circuit also displays transition states for position of the setting items of the first operation screen to positions of setting items corresponding to the second operation screen, when operation screens are switched.

3. The display device of claim 1, wherein:
the display control circuit displays setting items, for which display position of the setting items changes, differently to other setting items when the first and second operation screens are switched.

4. The display device of claim 1, wherein:
together with changing display position of the setting items when the first and second operation screens are switched, the display control circuit also displays those setting items by changing size.

5. The display device of claim 1, wherein:
the first and second operation screens belong to a plurality of operation screens, and the plurality of operation screens are screens in which at least some setting items are the same, but display format is different.

6. The display device of claim 5, wherein:
when the plurality of operation screens are simultaneously displayed, at least some or all of regions of the operation screens before and after switching are displayed at the same time.

7. The display device of claim 5, wherein:
the plurality of operation screens are screens in which at least some setting items are the same, but the number or display position of setting items displayed on the operation screen are different.

8. The display device of claim 5, wherein:
among the plurality of operation screens, at least one is an operation screen with which it is possible to set a plurality of shooting parameters at the same time by changing a single setting item.

9. The display device of claim 5, wherein:
the operation member is operated in order to directly switch to a designated operation screen.

10. The display device of claim 5, wherein:
the display control circuit switches display by rotating the operation screens about a rotational axis.

11. The display device of claim 5, wherein:
the display control circuit switches display by sliding the first and second operation screens.

12. The display device of claim 5, wherein:
a third operation screen that is different to the first and second operation screens is further provided, and when switching from the among one of the first, second, and third operation screens to another of the first, second, and third operation screens, the display control circuit switches screens in a direction that requires a fewest number of switches.

13. The display device of claim 5, wherein:
the display control circuit displays change in display appearance of the setting items when the first and second operation screens are switched, and causes display of transition states.

14. The display device of claim 1, wherein the display device is provided on a back surface of a digital camera and covers most of the back surface of the digital camera.

15. The display device of claim 1, wherein a setting item selected in the first screen is depicted in each of the plurality of transition screens.

16. The display device of claim 1, wherein the transition screens cannot be operated on by the operation member.

17. A display method for a display device having a display, comprising:
causing a first operation screen, for selection of setting items to be used from among a plurality of provided setting items, to be displayed on the display, the first operation screen displaying a plurality of setting items on almost all portions within a screen, detecting whether there has been an operation to switch from the first operation screen to a second operation screen that includes at least one setting item that is different to those of the first operation screen, and in which arrangement position of the setting items is different to that of the first operation screen, the second operation screen displaying a plurality of setting items only at portions close to one or more edges within the screen, and when detecting whether the operation has been performed, if it is detected that the operation for switching has been performed responsive to receiving a user selection of one of the plurality of setting items via a button press or touching of a setting item displayed on the first operation screen, causing display of switching from the first operation screen to the second operation screen, wherein when there is a switch from the first operation screen to the second operation screen, change in display appearance of the setting items is displayed by (1) generating a plurality of transition screens that are different from both the first operation screen and the second operation screen, in order to show change from the first operation screen to the second operation screen, and (2) sequentially displaying the plurality of transition screens.

* * * * *